United States Patent
Miyaji

(10) Patent No.: US 6,697,946 B1
(45) Date of Patent: Feb. 24, 2004

(54) MESSAGE RECOVERY SIGNATURE APPARATUS

(75) Inventor: Atsuko Miyaji, Noumi-gun (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/341,658

(22) PCT Filed: Jan. 28, 1997

(86) PCT No.: PCT/JP97/00181

§ 371 (c)(1),
(2), (4) Date: Jul. 15, 1999

(87) PCT Pub. No.: WO98/33159

PCT Pub. Date: Jul. 30, 1998

(51) Int. Cl.$^7$ .................................................. H04L 9/00
(52) U.S. Cl. ........................... 713/180; 380/28; 380/30; 380/44; 380/46
(58) Field of Search ................. 380/28, 29, 30, 380/255, 259, 44, 286; 713/176, 180

(56) References Cited

U.S. PATENT DOCUMENTS 5,136,642 A * 8/1992 Kawamura et al. .......... 380/282
5,600,725 A * 2/1997 Rueppel et al. ............... 380/30
6,141,420 A * 10/2000 Vanstone et al. .............. 380/30

OTHER PUBLICATIONS

Paar, Fleischmann, Rodriguez, Fast Arithmetic for Public Key Algorithm in Galois Fields with Composite Exponents, IEEE Transaction on Computers, Oct. 1999, vol. 48, pp. 1–26.*
Menezes, Dorschot, Vanstone (Handbook of Applied Cryptography) CRC Press 1996 pp. 80–81.*
"Cryptography, Zero-Knowledge Proof, and Number Theory," T. Okamoto & K. Ohta eds., Kyoritysu 1995.
Cryptography: Theory and Practice, by D. R. Stinson, Kyoritsu 1996.

* cited by examiner

Primary Examiner—Ayaz Sheikh
Assistant Examiner—Hosuk Song

(57) ABSTRACT

A management center 520 determines a public key $y^A$ of a user A 510 using the user A's secret key $x_A$ and announces the public key $y_A$ to a user B 530. The user A 510 repeats generation of a random number k and calculation of $r_1 = g^k$ (mod p) and $r_2 = f(r_1,m) = r_1 + m \pmod{p}$ until $r_2$ and q meet a condition $r_2 < q$. If the condition is met, the user A 510 finds s by calculating $sk = (r_2+S+1)+r_2 x_A \pmod{q}$ and sends a ciphertext $(r_2,s)$ to the user B 530. The user B 530 rejects the ciphertext if $q \leq r_2$. If $r_2 < q$, the user B 530 recovers a message m by calculating $r_1 = g^k = g^{(r2+s+1)/s} y_A^{r2/s} \pmod{p}$ and $f^{-1}(r_1,r_2) = m \pmod{p}$. With this procedure, a highly secure message recovery signature apparatus is realized.

28 Claims, 11 Drawing Sheets

MESSAGE RECOVERY SIGNATURE APPARATUS

FIELD OF THE INVENTION

The present invention relates to an apparatus for performing secret communications and digital signatures by a public key cryptosystem, and especially relates to a message recovery signature apparatus whose security is based on the discrete logarithm problem.

DESCRIPTION OF THE PRIOR ART

Nyberg-Rueppel proposes a message recovery signature scheme which is carried out by a public key cryptosystem using the discrete logarithm problem as a basis for security (see Nyberg & Rueppel "A New Signature Scheme Based on the DSA Giving Message Recovery" 1st ACM Conference on Computer and Communications Security (1993)).

"Discrete logarithm" is a logarithm over a finite field.

"Discrete logarithm problem" is as follows. Let p be a prime number or a prime number raised to a given power, g be a primitive root of a finite field GF(p), and y, p, and g be any elements of GF(p) aside from zero. The problem is to find an integer x that satisfies $$y = g^x \qquad \text{(Equation 1.1)}$$

where $0 \leq x \leq p-1$.

"Using the discrete logarithm problem as a basis for security" is due to the following reason. Though the exponential calculation is easy, the above logarithmic calculation is extremely difficult for a large finite field GF(p), such as $GF(2^{127})$ Such a logarithmic calculation corresponds to the calculation of the inverse of a one-way function and thus assists in the security of encryption.

"Public key cryptosystem" is a cryptosystem that uses different keys for encryption and decryption, with the decryption key being kept secret and the encryption key being made public. Public key encryption provides a convenient method for managing the separate encryption keys of many users, and so has become a fundamental technique for performing communications with a large number of users.

"Message recovery signature" is a signature for certifying the validity of the signer, with the message being embedded within the signature. With this technique, the message and the signature do not have to be sent separately, so that the traffic for transmission can be reduced.

FIG. 11 is a sequential view showing the processing of the above conventional signature scheme.

A user A 610, a management center 620, and a user B 630 are connected with each other via a network. Here, the user A 610 signs a message m and sends it to the user B 630 under management of the management center 620.

<Public Key Generation>

A prime number is set as p, an element of GF(p) is set as g, and the order of g is set as q as the system conditions. Which is to say, q is the smallest integer that satisfies $$g^q = 1 (\bmod p) \qquad \text{(Equation 1.2)}$$

First, the management center 620 generates a public key $y_A$ for the user A 610 using the user A's secret key $x_A$ which has been informed beforehand, according to $$y_A = g^{x_A} \qquad \text{(Equation 1.3)}$$

(S640~S641).The management center 620 then reveals the system parameters p, q, and g together with the public key $y_A$ of the user A 610 to the user B 630 (S643)

<Signature and Transmission>

The user A 610 generates a random number k (S644), calculates $$r_1 = g^k (\bmod p) \qquad \text{(Equation 1.4)}$$

$$r_2 = m/r_1 (\bmod p) \qquad \text{(Equation 1.5)}$$

$$r_2' = r_2 (\bmod q) \qquad \text{(Equation 1.6)}$$

$$s = k - r_2' x_A (\bmod q) \qquad \text{(Equation 1.7)}$$

in sequence (S645~S648), and sends s and $r_2$ to the user B 630 as a ciphertext $(r_2,s)$ (S649).

Here, $r_1$ is referred to as a commitment, Equation 1.5 as a message-mask equation, and Equation 1.7 as a signature equation. Equation 1.7 leads to the following six types of $$ak = b + cx_A (\bmod q) \qquad \text{(Equation 1.8)}$$

where (a,b,c) is a permutation of $(1, r_2', s)$, that is, a=1, b=$r_2'$, c=s
a=1, b=s, c=$r_2'$
a=$r_2'$, b=1, c=s
a=$r_2'$, b=s, c=1
a=s, b=$r_2'$, c=1
a=s, b=1, c=$r_2'$ Note that (mod p) and (mod q) denote operations modulo p and q, respectively.

<Message Recovery>

The user B 630 receives the ciphertext $(r_2,s)$ and recovers the message m by computing $$g^s y_A^{r_2'} r_2 = m (\bmod p) \qquad \text{(Equation 1.9)}$$

with the revealed public key $y_A$ and system parameters p, q, g, a, b, and c (S650). Equation 1.9 is derived from $$\begin{aligned} m &= r_1 r_2 \\ &= g^k r_2 \\ &= g^{s + r_2' x_A} r_2 \\ &= g^s g^{x_A r_2'} r_2 \\ &= g^s y_A^{r_2'} r_2 \end{aligned} \qquad \text{(Equation 1.10)}$$

Thus, the above conventional scheme is a breakthrough in the sense that message recovery signatures by a public key cryptosystem based on the discrete logarithm problem are made possible for the first time.

Nevertheless, this conventional scheme is vulnerable to four types of attack given below.

(Signature-equation Attack)

The signature-equation attack is as follows.

If a forger acquires the message m and its signature $(r_2, s)$, the forger can forge a new message $mg^d$ (d is any element of GF(p)), sign the message $mg^d$, and send it to the user B.

Which is to say, the forger sends a ciphertext $(r_2, s+d)$ to the user B. The user B then calculates $$g^{s+d} y_A^{r_2'} r_2 = g^s y_A^{r_2'} r_2 g^d \qquad \text{(Equation 1.11)}$$
$$= mg^d$$

If the recovered message $mg^d$ is intelligible, the user B will think that the message is from the user A. Hence the forger can successfully sign the new message $mg^d$ without knowledge of the secret key $x_A$.

(Homomorphism Attack)

The homomorphism attack is as follows.

If a forger chooses a message mm, has the user A sign the message mm, and acquires the signature, the forger can impersonate the user A and sign a desired message $mmg^d$.

This attack is possible for the same reason as the signature-equation attack. The difference with the signature-equation attack is that the forger can sign the desired message $mmg^d$.

(Redundancy Attack)

The redundancy attack is as follows.

If a forger acquires the message m and its signature $(r_2,s)$, the forger can sign a new message mm that satisfies $$rr_2 = r_2' + nq \, (\neq r_2) \quad \text{(Equation 1.12)}$$

$$mm = rr_2 \times (m/r_2) \quad \text{(Equation 1.13)}$$

Which is to say, the forger sends a ciphertext $(rr_2,s)$ to the user B. Then the user B computes $$g^s y_A^{rr_2'} rr_2 = g^s y_A^{r_2'} rr_2 \quad \text{(Equation 1.14)}$$
$$= (m/r_2) rr_2$$
$$= mm$$

If the recovered message mm is intelligible, the user A will think that the message is from the user A.

This attack is based on redundancy between $r_2'$ used in Equation 1.7 and r2 calculated in Equation 1.6.

(Recovery-equation Attack)

The recovery-equation attack is as follows.

Without performing communications beforehand, a forger can sign a message $My_A^e$ (e is an element of GF(p)) using any new M (M is an element of GF(p)).

Specifically, the forger determines $rr_2$ and ss that satisfy $$rr_2 = My^u g^v \text{ (where } u \text{ and } v \text{ are elements of } GF(p)) \quad \text{(Equation 1.15)}$$

$$ss = -v \quad \text{(Equation 1.16)}$$

$$e = rr_2' + u \quad \text{(Equation 1.17)}$$

and sends a ciphertext $(rr_2,ss)$ to the user B. The user B then calculates $$g^{ss} y_A^{rr_2'} rr_2 = y_A^e My \quad \text{(Equation 1.18)}$$
$$= My_A^e$$

If the recovered message $My_A^e$ makes sense, the user B will think that the message is from the user A.

This attack is based on that, for the elements u and v of GF(p), there are solutions that satisfy $$rr_2 = My_A^u g^v \quad \text{(Equation 1.19)}$$

$$v = -b/a \text{ (where } a \text{ and } b \text{ are elements of } \{1, r_2', s\}) \quad \text{(Equation 1.20)}$$

The above four attacks are detailed in Atsuko Miyaji *Weakness in Message Recovery Signature Schemes* 1 Institute of Electronics, Information, and Communication Engineers, Information Security Workshop (July 1995), Nyberg & Rueppel "A New Signature Scheme Based on the DSA Giving Message Recovery" 1st *ACM Conference on Computer and Communications Security* (1993), and Nyberg & Rueppel "Message Recovery for Signature Schemes Based on the Discrete Logarithm Problem" *Advances in Cryptology-Proceedings of Eurocrypt '94, Lecture Notes in Computer Science*, vol.950 (1995) Springer-Verlag, pp.182–193.

Thus, the conventional message recovery signature scheme is weak against the four attacks that can forge signatures of messages which satisfy certain conditions.

DISCLOSURE OF THE INVENTION

In view of the stated problems of the conventional signature scheme, the present invention aims to provide a message recovery signature apparatus that is secure against the above four attacks.

The above object can be fulfilled by a message recovery signature apparatus for signing a message m with a secret key $x_A$ using a discrete logarithm problem as a basis for security, based on operations performed on a finite field GF(p) where p is a prime number and g is an element whose order is q, the message recovery signature apparatus including: a random number generating unit for generating a random number k; a commitment generating unit for generating a commitment $r_1$ from the random number k according to a function $f_{11}(k) = g^k$; a message masking unit for generating a masked message $r_2$ from the commitment $r_1$ and the message m according to a function $f_{12}(r_1, m)$ that maps $GF(p) \times GF(p)$ into the finite field GF(p); and a signature generating unit for generating a signature s from the masked message $r_2$ and the secret key $x_A$ according to a function $f_{13}(r_2, x_A)$ the message recovery signature apparatus being characterized in that the function $f_{12}(r_1, m)$ has a property that when $g^{x_A}$ denotes a public key $y_A$ and t, j, and e denote elements of a finite ring $Zq = \{0, 1, \ldots, q-1\}$, the three variables t, j, and e are unable to be replaced with two algebraic relations in $f_{12}(g^t y_A^j, m y_A^e)$ and $f_{12}(g^t y_A^j, m g^e)$.

With this construction, substituting $Mg^e$ or $My_A^e$ for the message m cannot determine the three variables t, j, and e that satisfy $r_2 = f_{12}(\ )$. Also, the inverse $f^{-1}$ of the map f is $$f^{-1}(r_1/g, r_2) \neq \phi(m, g)$$

and $$f^{-1}(r_1/y_A, r_2) \neq \phi(m, y_A)$$

respectively for arbitrary functions $\phi$ and $\phi$ of two variables. Accordingly, the recovery-equation attack and the homomorphism attack can be avoided.

Here, the signature generating unit may calculate, when $Zq = \{0, 1, \ldots, q-1\}$ is a finite ring and ha, hb, and hc are functions that map $Zq \times Zq \times Zq$ into Zq, a signature s which satisfies $$ha(r_2', s, 1)k = hb(r_2', ks, 1) + hc(r_2', s, 1) x_A \pmod{q}$$

where the functions ha, hb, and hc satisfy conditions (1) and (2):

(1) if $ha(r_2',s,1) = ha(rr_2',ss,1)$ and $hc(r_2',ss,1) = hc(rr_2',ss,1)$, then $hb(r_2',s,1) - ha(r_2',s,1) \neq hb(rr_2',ss,1)$ (2) if $ha(r_2',s,1) = ha(rr_2',ss,1)$ and $hb(r_2',s,1) = hb(rr_2',ss,1)$, then $hc(r_2',s,1) - ha(r_2',s,1) \neq hc(rr_2,ss,1)$ for any elements $rr_2'$ and ss of the finite ring Zq aside from a few prefixed values.

With this construction, a forger who tries to sign a message $mg^d$ cannot find $rr_2'$ and ss which satisfy the signature equation (that is, $rr_2' = ss = 0$). Accordingly, the signature-equation attack can be avoided.

Here, the message recovery signature apparatus may further include: a judging unit for judging whether the masked message $r_2$ generated by the message masking unit meets a condition $0<r_2<q$; and a repeating unit for having, when the judging unit judges that the condition is unmet, the random number generating unit, the commitment generating unit, and the message masking unit respectively generate a new random number k, a commitment $r_1$, and a masked message $r_2$.

With this construction, the redundancy between $r_2$ and $r_2'$ is eliminated. Accordingly, the redundancy attack can be avoided.

Here, the operations may be performed on a finite field $GF(p')$ instead of a finite field $GF(p)$.

Here, the operations may be performed on an elliptic curve $E(GF(p))$ or $E(GF(p'))$ instead of a finite field $GF(p)$. With this construction, faster message recovery signature processing and recovery processing, strengthened security, and compact circuitry and software implementations can be achieved.

DESCRIPTION OF THE PREFERRED EMBODIMENTS

The following is a detailed description of a message recovery signature apparatus of the present invention with reference to the figures.

First Embodiment

Figure 1:
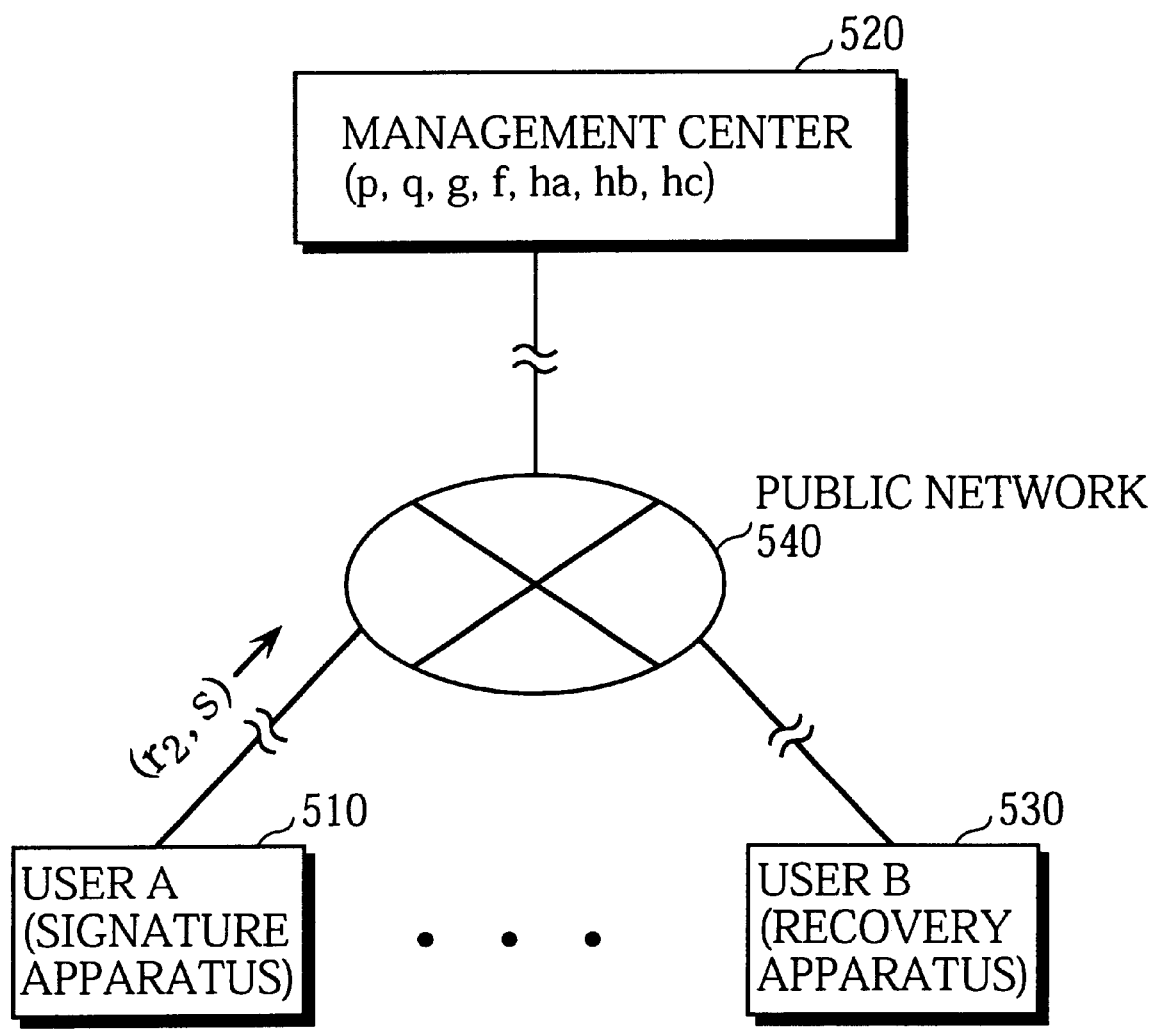
FIG. 1 shows the configuration of the first embodiment of a products trading system that uses a message recovery signature apparatus of the present invention.

FIG. 1 shows the configuration of the first embodiment of a products trading system that uses a message recovery signature apparatus of the present invention.

This system includes a management center 520 which manages communications for products trading, a user A 510 as an orderer of products, a user B 530 as a seller of the products, and a public network 540 which connects the management center 520 and the users in the system. In this system, message recovery signatures by encryption are used to place orders for products in order to ensure safe products trading.

Figure 2:
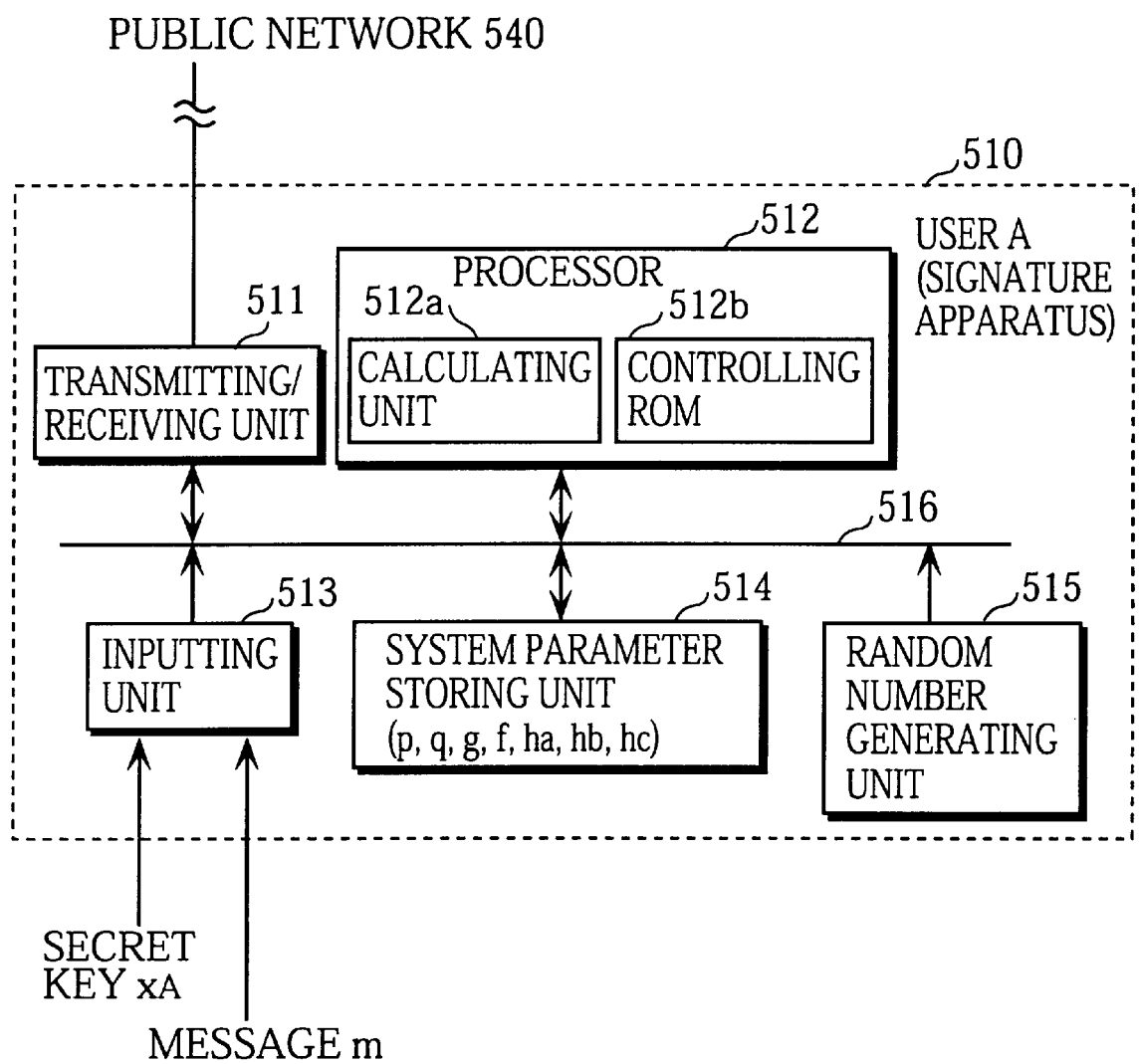
FIG. 2 shows the detailed hardware construction of the message recovery signature apparatus (user A) 510 of the present invention.

The user A 510 is a message recovery signature apparatus of the present invention and is roughly made up of a transmitting/receiving unit 511 connected to an internal bus 516, a processor 512, an inputting unit 513, a system parameter storing unit 514, and a random number generating unit 515, as shown in FIG. 2.

The transmitting/receiving unit 511 is a communication interface, such as a modem, which connects the public network 540 with the internal bus 516.

The processor 512 is a CPU or the like equipped with a calculating unit 512a and a controlling ROM 512b storing a control program unique to the signature apparatus 510, and performs calculations and transmission control for signatures according to a certain procedure (described later), as well as controlling each component of the signature apparatus 510.

The inputting unit 513 is a keyboard or an I/O (input-output) port that receives a secret key $x_A$ and a message m.

The system parameter storing unit 514 is a RAM or the like that temporarily stores system parameters downloaded from the management center 520. System parameters referred to here are parameters necessary for the message recovery signature scheme used in the present system and have been made public.

The random number generating unit 515 generates a random number which is a positive integer within a range designated by the processor 512.

Figure 3:
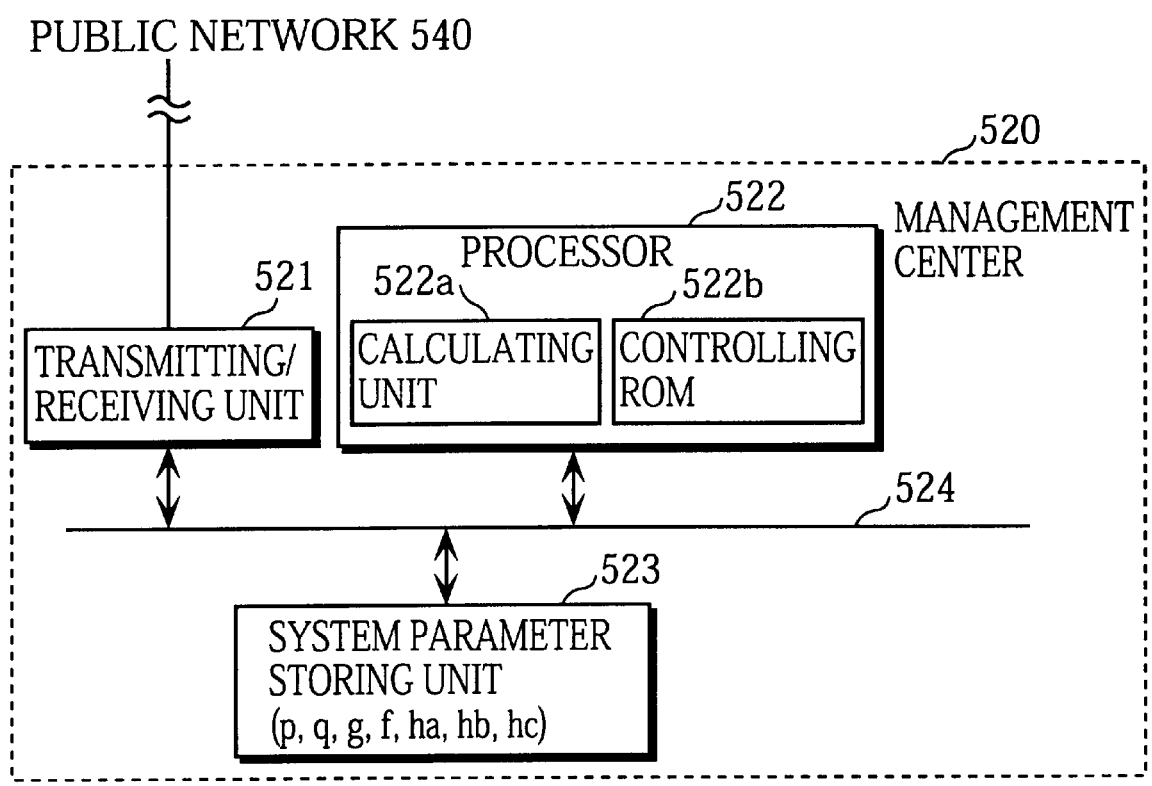
FIG. 3 shows the detailed hardware construction of a management center 520.

The management center 520 is an apparatus for managing the system parameters and is equipped with a transmitting/receiving unit 521 connected to an internal bus 524, a processor 522, and a system parameter storing unit 523, as shown in FIG. 3.

The transmitting/receiving unit 521 is a communication interface, such as a modem, that connects the public network 540 with the internal bus 524.

The processor 522 is a CPU or the like equipped with a calculating unit 522a and a controlling ROM 522b storing a control program unique to the management center 520, and performs public key generation and system parameter transmission for each user according to a certain procedure (described later), as well as controlling each component of the management center 520.

The system parameter storing unit 523 is a ROM or the like that prestores the system parameters necessary for the message recovery signature scheme of the present system.

Figure 4:
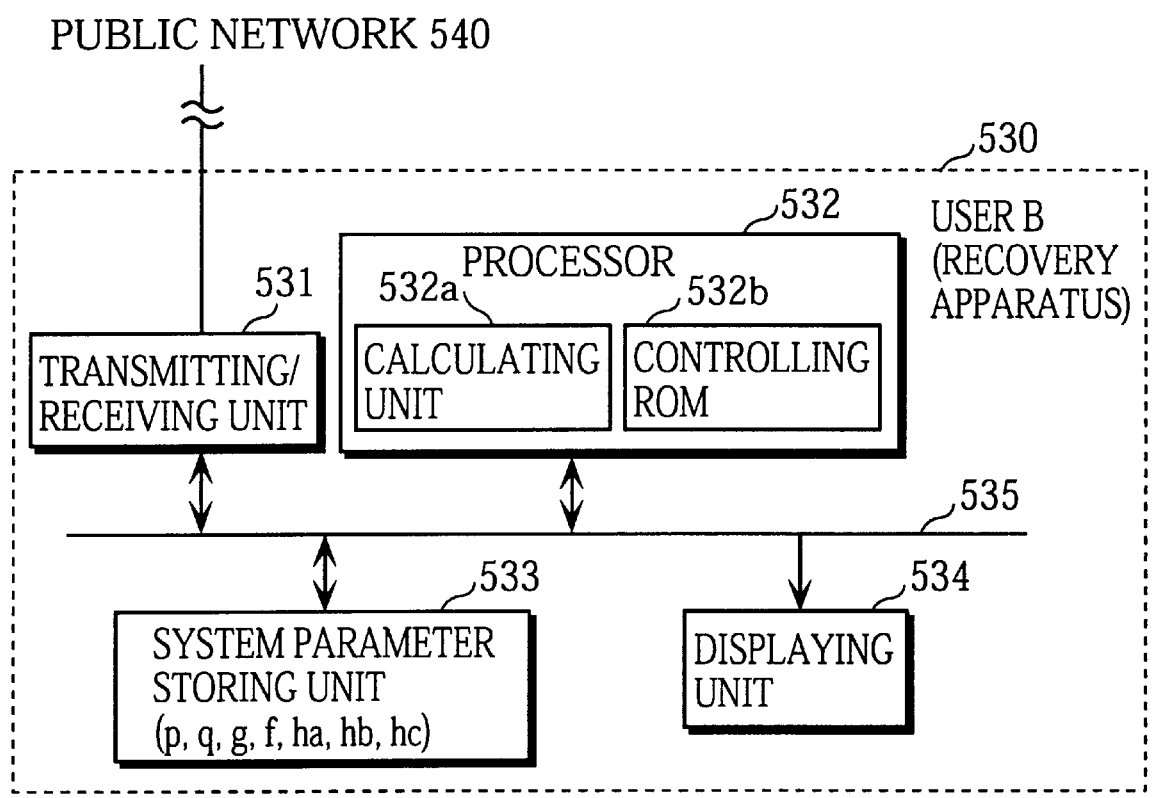
FIG. 4 shows the detailed hardware construction of a recovery apparatus (user B) 530.

The user B 530 is a recovery apparatus for recovering a message sent from the user A 510 and is roughly made up of a transmitting/receiving unit 531 connected to an internal bus 535, a processor 532, a system parameter storing unit 533, and a displaying unit 534, as shown in FIG. 4.

The transmitting/receiving unit 531 is a communication interface, such as a modem, that connects the public network 540 with the internal bus 535.

The processor 532 is a CPU or the like equipped with a calculating unit 532a and a controlling ROM 532b storing a control program unique to the recovery apparatus 530, and performs message recovery according to a certain procedure (described later), as well as controlling each component of the recovery apparatus 530.

The system parameter storing unit 533 is a RAM or the like that temporarily stores the system parameters downloaded from the management center 520.

The displaying unit 534 is a CRT (Cathode-Ray Tube) or the like that displays a recovered message. If the message displayed on the displaying unit 534 makes sense, the user B 530 verifies that the message (order) is from the user A 510.

The public network 540 is a public telephone network or ISDN (Integrated Services Digital Network). Communications in the present system are performed by the Internet with the public network 540 as a physical layer and TCP/IP (Transmission Control Protocol/Internet Protocol) as an intermediate layer.

The operation of the present system with the above configuration will be explained below.

Figure 5:
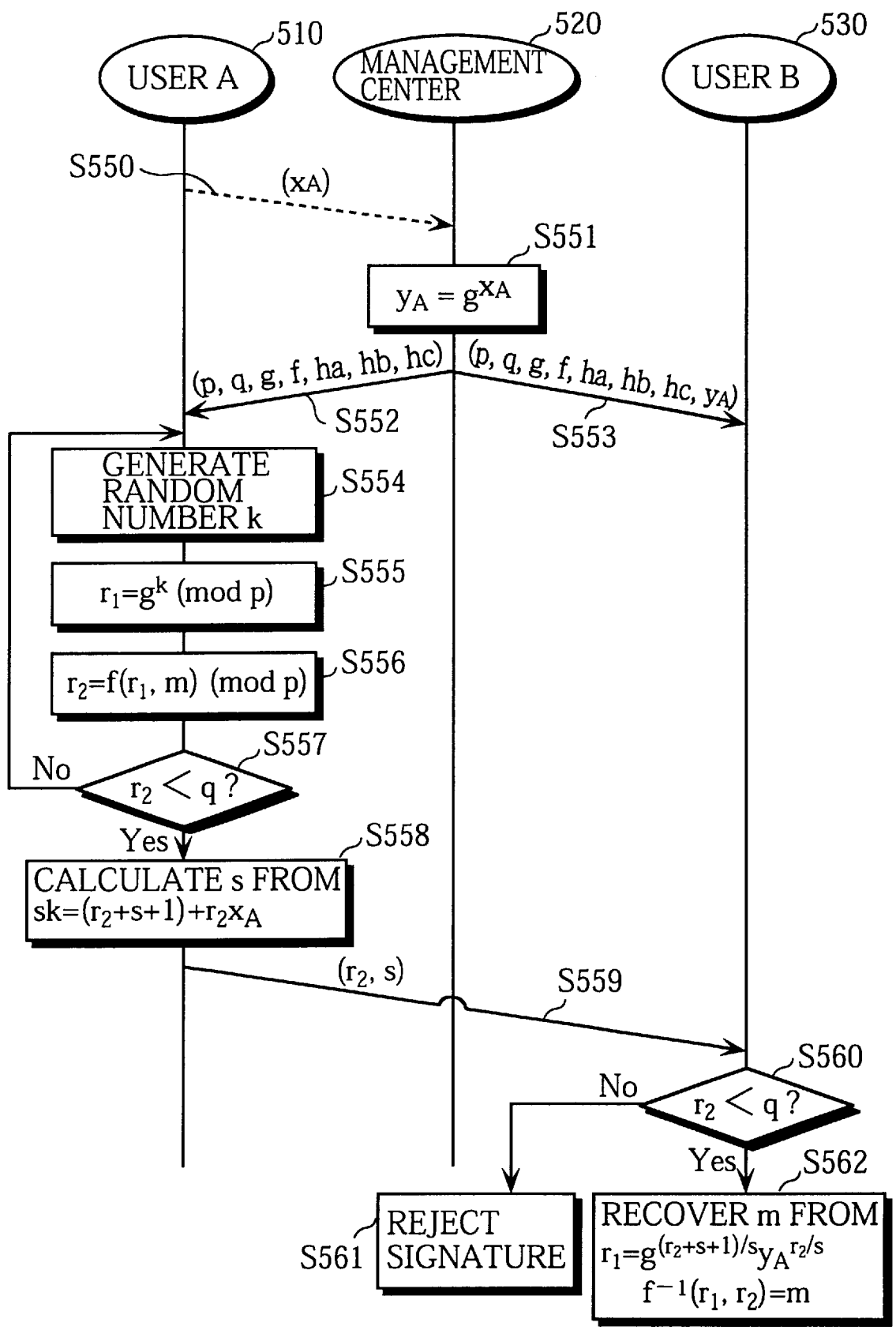
FIG. 5 is a sequential view showing the message recovery signature algorithm and data exchange in the first embodiment.
Figure 11:
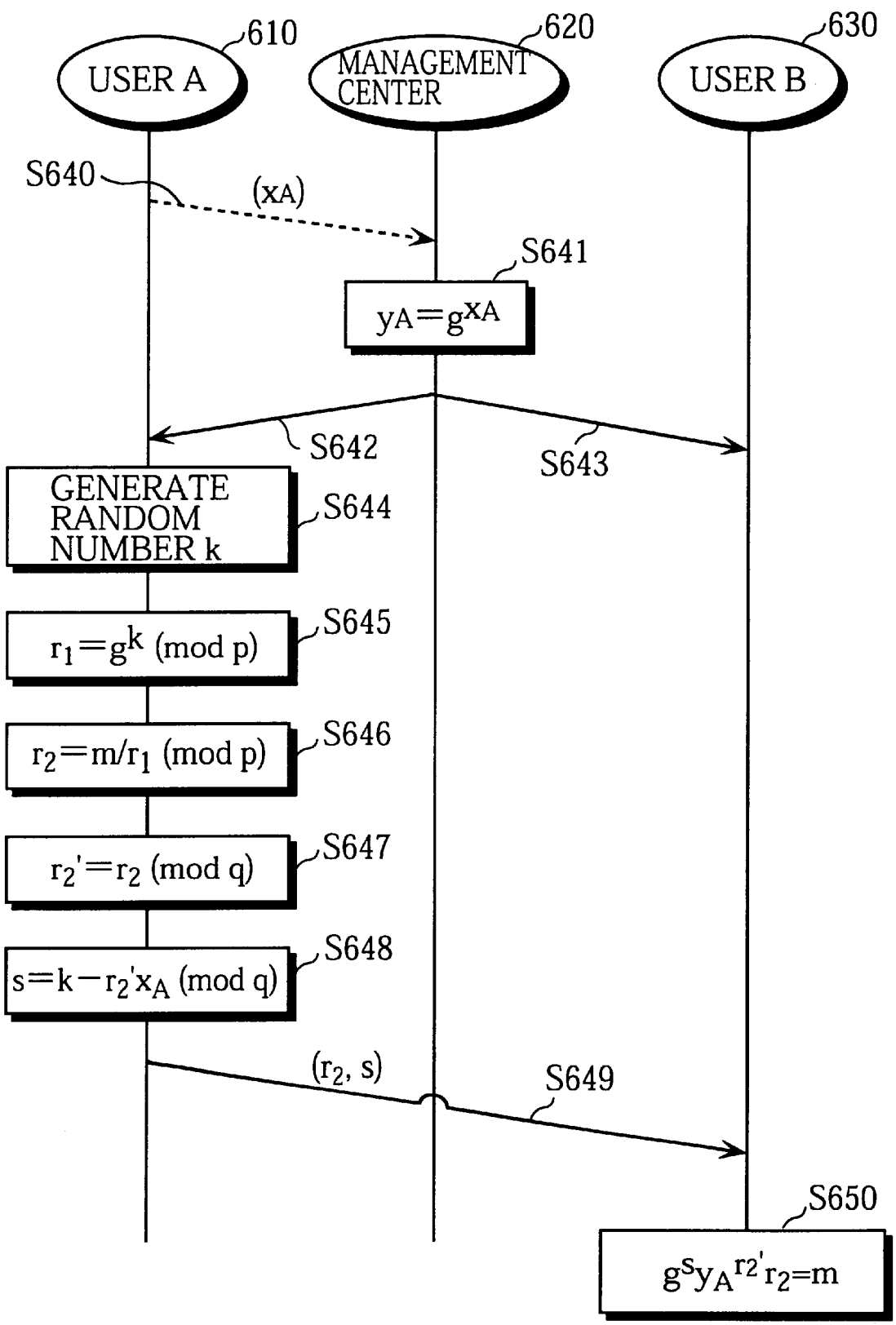
FIG. 11 is a sequential view showing the procedure of the conventional message recovery signature scheme.

FIG. 5 shows the message recovery signature algorithm and data exchange between the three parties (user A 510, management center 520, and user B 530) in the present system and corresponds to FIG. 11 of the conventional scheme.

<System Conditions>

The system conditions of the message recovery signature scheme in the present system are as follows.

The message recovery signature scheme used in this system is a public key cryptosystem that uses the discrete logarithm problem as the founding principle for the security, and is based on operations over a finite field GF(p) where p (512 bits long) is a prime number, g is an element, and q (256 bits long) is the order of g. Here, the prime number p and the order q are set to be equivalent, that is, p~q.

A map f( ) from GF(p)×GF(p) to GF(p) is defined as $$f(r_1, m) = r_1 + m \pmod{p} \quad \text{(Equation 2.1)}$$

and the inverse $f^{-1}$ of f is defined as $$f^{-1}(r_1, f(r_1, m)) = f(r_1, m) - r_1 \quad \text{(Equation 2.2)}$$
$$= m$$

Here, the message m is a value representing a combination of binary numbers obtained when, for example, "I would like to order a product ABC. My identification code is 1234." is expressed in a character code such as the shifted JIS code.

Meanwhile, a signature equation used by the orderer of the product is defined as $$ha(r_2', s, 1)k = hb(r_2', s, 1) + hc(r_2', s, 1)x_A \pmod{q} \quad \text{(Equation 2.3)}$$

where ha, hb, and hc are maps from Zq×Zq×Zq to Zq (where Zq={0, 1, . . . , q−1} and are set in the present embodiment respectively as follows:

$$ha(r_2', s, 1) = s \quad \text{(Equation 2.4)}$$

$$hb(r_2', s, 1) = r_2' + s + 1 \pmod{q} \quad \text{(Equation 2.5)}$$

$$hc(r_2', s, 1) = r_2' \quad \text{(Equation 2.6)}$$

The system parameters (p, q, g, f, ha, hb, hc) that define the above system conditions have been stored in the system parameter storing unit 523 in the management center 520 in advance.

<Public Key Generation>

The management center 520 generates a public key $y_A$ of the user A 510 using the element g of GF(p) and the user A's secret key $x_A$ which has been informed by the user A 510 by communication or a confidential letter (S550), according to the following equation $$y_A = g^{x_A} \quad \text{(Equation 2.7)}$$

(S551). More specifically, the processor 522 has the calculating unit 522a perform the above exponentiation according to the program stored in the controlling-ROM 522b, using the user A's secret key $x_A$ received via the transmitting/receiving unit 521 and the system parameter g read from the system parameter storing unit 523.

The management center 520 then announces the system parameters (p, q, g, f, ha, hb, hc) to the user A 510 and the user B 530, and informs the user B 530 of the user A's public key $y_A$ (S552 and S553).

<Signature and Transmission>

The user A 510 signs and transmits the message m according to the following procedure (S554~S559).

(Step S554)

To place an order with the user B 530 for the product, the user A 510 first stores the received system parameters in the system parameter storing unit 514 and generates a random number k (512 bits long).

Specifically, in accordance with the program in the controlling ROM 512b, the processor 512 stores the system parameters received via the transmitting/receiving unit 511 in the system parameter storing unit 514, has the random number generating unit 515 generate the random number k on GF(p), and acquires the random number k.

(Step S555)

The user A 510 then finds a commitment $r_1$ by computing $$r_1 = g^k \pmod{p} \quad \text{(Equation 2.8)}$$

More specifically, in accordance with the program in the controlling ROM 512b, the processor 512 reads g from the system parameter storing unit 514 and has the calculating unit 512a perform the above exponentiation modulo p through use of g and the random number k.

(Step S556)

The user A 510 further finds $r_2$ as follows:

$$r_2 = f(r_1, m) \quad \text{(Equation 2.9)}$$
$$= r_1 + m \pmod{p}$$

Specifically, the processor 512 receives the message m from the inputting unit 513 and has the calculating unit 512a perform the above addition modulo p for m and $r_1$ obtained in step S555.

(Step S557)

The processor 512 then compares $r_2$ and q according to the program in the controlling ROM 512b. If $q \leq r_2$, steps S554~S556 are repeated.

(Step S558)

If, on the other hand, $r_2 < q$, the user A 510 solves s from the signature equation $$ha(r_2', s, 1)k = hb(r_2', s, 1) + hc(r_2', s, 1)x_A \pmod{q} \quad \text{(Equation 2.10)}$$

that is $$sk = (r_2 + s + 1) + r_2 x_A \pmod{q} \quad \text{(Equation 2.11)}$$

More specifically, the processor 512 receives the secret key $x_A$ via the inputting unit 513 and has the calculating unit 512a solve s modulo q.

(Step S559)

Lastly, the user A 510 sends a ciphertext $(r_2, s)$ to the user B 530.

Specifically, the processor 512 sends the ciphertext $(r_2, s)$ to the user B 530 via the transmitting/receiving unit 511.

<Message Recovery>

(Step S560)

The user B 530 compares $r_2$ with q on receiving the system parameters and the ciphertext ($r_2$'s).

Specifically, in accordance with the program stored in the controlling ROM 532b, the processor 532 temporarily holds the ciphertext ($r_2$,s) received via the transmitting/receiving unit 531 and has the calculating unit 532a compare $r_2$ with q read from the system parameter storing unit 533.

(Step S561)

If $q \leq r_2$, the user B 530 rejects the signature.

Here, the processor 532 displays on the displaying unit 534 that message recovery for the ciphertext ($r_2$,s) received from the user A 510 ended in failure.

(Step S562)

If $r_2 < q$, the user B 530 finds $r_1$ by computing $$r_1 = g^k \quad \text{(Equation 2.12)}$$
$$= g^{(r2+s+1)/s} y_A^{r2/s} \pmod{p}$$

and recovers the message m according to $$f^{-1}(r_1, r_2) = m \pmod{p} \quad \text{(Equation 2.13)}$$

which can be expanded to $$\begin{aligned} m &= f^{-1}(r_1, r_2) \\ &= r_2 - r_1 \\ &= r_2 - g^k \\ &= r_2 - g^{(r2+s+1)/s} y_A^{r2/s} \end{aligned} \quad \text{(Equation 2.14)}$$

More specifically, the processor 532 has the calculating unit 532a recover the message m using the system parameters and the user A's public key $y_A$ revealed by the management center 520, and displays the recovered message on the displaying unit 534. If the displayed message is an intelligible order, the user B 530 authenticates the message as being sent from the user A 510.

With the above message recovery signature scheme of the first embodiment, the shortcomings present in the conventional scheme can be overcome in the following way.

Concerning the map from $r_1 + m$ to $r_2$, an equation $$\begin{aligned} m &= r_2 r_1 \\ &= r_2 g^s y_A^{r2'} \end{aligned} \quad \text{(Equation 2.15)}$$

holds from Equation 1.5 in the conventional scheme.

Substituting $m = Mg^e$ (or $My_A^e$) and $r_2 = Mg^t y_A^j$ (where t, j, and e are elements of Zq) yields $$g^e = g^{s+t} y_A^{r2'+j} \quad \text{(Equation 2.16)}$$

where the three variables t, j, and e can be replaced with two algebraic relations. Hence the map from $r_1$ to $r_2$ is a homomorphism.

In the present embodiment, on the other hand, it is clear from Equation 2.9 that the map from $r_1$ to $r_2$ is not a homomorphism, which is to say, three variables t, j, and e that are elements of Zq cannot be replaced with two algebraic relations in $f(g^t y_A, m y_A^e)$ and $f(g^t y_A^j, mg^e)$. . . . (Condition 1).

In other words, substituting $Mg^e$ or $My_A^e$ for the message m cannot determine the three variables t, j, and e that satisfy $r_2 = f(\ )$.

Also, the inverse map $f^{-1}$ of f defined in Equation 2.2 establishes the relationship $$f^{-1}(r_1/g, r_2) \neq \phi(m, g)$$
$$f^{-1}(r_1/y_A, r_2) \neq \phi(m, y_A) \quad \text{(Equation 2.17)}$$

for arbitrary functions φ and ϕ of two variables, respectively.

Therefore, the recovery-equation attack and the homomorphism attack can be prevented.

Concerning the signature equation, in the conventional scheme a set of coefficients (a,b,c) is a permutation of ($r_2$',s,1) as shown in Equation 1.8, whereas in the present embodiment (a,b,c) is defined using the maps ha, hb, and hc. Assume that $r_2$' and s are elements of Zq, then the maps ha, hb, and hc satisfy the following two conditions for every $rr_2$' and ss aside from a few prefixed values.

(1) If ha($r_2$',s,1)=ha($rr_2$',ss,1) and hc($r_2$',s,1)=hc($rr_2$',ss,1), then $$hb(r_2',s,1) - ha(r_2',s,1) \neq hb(rr_2',ss,1) \quad \text{(Equation 2.18)}$$

(2) If ha($r_2$',s,1)=ha($rr_2$',ss,1) and hb($r_2$',s,1)=hb($rr_2$',ss,1), then $$hc(r_2',s,1) - ha(r_2',s,1) \neq hc(rr_2',ss,1) \quad \text{(Equation 2.19)}$$

As is evident from the signature equation (Equations 2.10 and 2.11) of the present embodiment, a forger who tries to sign a message $mg^d$ cannot find $rr_2$' and ss which satisfy the signature equation (that is, $rr_2$'=ss=0). Hence the signature-equation attack can be avoided.

Further, the signature equation of the present embodiment is strong against conventional cryptanalysis that uses proportional relations, as the equation cannot be decomposed into two terms. For details on the cryptanalysis attack using proportional relations, see L. Harn & Y. Xu "Design of Generalised ElGamal Type Digital Signature Schemes based on Discrete Logarithm" *Electronics Letters* vol. 30 (1994) pp.2025~2026.

Concerning the value of $r_2$, in the conventional scheme there is redundancy between $r_2$' in Equation 1.7 and $r_2$ in Equation 1.6, whereas in the present embodiment the value of $r_2$' is limited to smaller than q.

Accordingly, $rr_2$ that satisfies Equation 1.12 does not exist, so that the redundancy attack is invalid against the present signature scheme.

Therefore, the four attacks which are valid against the conventional scheme can be avoided by the message recovery signature apparatus of the present embodiment.

While the function f has been set as $r_1 + m$ in the above embodiment, any map that satisfies Condition 1 may instead be used, though it is preferable to use a map, such as $r_1 + m$, with a small computation amount.

Also, the maps ha, hb, and hc are not limited to those used in the above embodiment but any maps that satisfy Equations 2.18 and 2.19 can be used, though it is preferable to use a map with a small computation amount in order to strengthen the security against the conventional cryptanalysis which uses proportional relations.

Also, incorporating the maps ha, hb, and hc into a message recovery signature scheme (e.g. the ElGamal signature scheme) different with the above conventional scheme can produce the same effect as the above embodiment.

The message recovery signature scheme based on operations over the finite field GF(p) has been used in the above embodiment. However, it is also possible to use a generalized message recovery signature scheme based on operations over the finite field GF($p^r$) where p is a prime number, r is a positive integer, and g is an element whose order is q, because if p is a prime number then GF($p^r$) forms a finite field.

In this case, it suffices to introduce a function π mapping GF($p^r$) into a finite ring $Zp^r = \{0, 1, \ldots, p^{r-1}\}$ and replace $r_2$ in the signature equation in step S558 with π($r_2$) obtained by converting $r_2$ in step S557 by the function $\pi$. In other words, the first embodiment corresponds to a special case where r=1 in signature schemes defined over the finite field GF(p′).

One specific example of the function $\pi$ is given here. When $\{\alpha 1, \alpha 2, \ldots \alpha r\}$ are base points on GF(p) of GF(p′) and $\{x1, x2, \ldots, xr\}$ are elements of GF(p), the function $\pi$ is defined as $$\pi(x)=x1+x2p+\ldots+xrp^{r-1} \quad \text{(Equation 2.20)}$$

for an element $x=x1\alpha 1+ \ldots +xr\alpha r$ of GF(p′).

Further, the signature scheme of the above embodiment can be modified in such a way that, instead of signing the message m the sender signs a hash value obtained by converting the message by a hash function and sends the signature to the recipient along with the message, and the recipient recovers the hash value from the signature to authenticate the message.

Second Embodiment

The following is a description of the second embodiment of the products trading system that uses the message recovery signature apparatus of the present invention.

The general configuration of the system in the second embodiment is the same as the first embodiment.

However, a message recovery signature scheme different from the first embodiment is used in the second embodiment. Accordingly, the controlling ROM 512b and system parameter storing unit 514 of the user A 510, the controlling ROM 522b and system parameter storing unit 523 of the management center 520, and the controlling ROM 532b and system parameter storing unit 533 of the user B 530 in the second embodiment have the storage contents different from the first embodiment. The following explanation will focus on the differences with the first embodiment.

Figure 6:
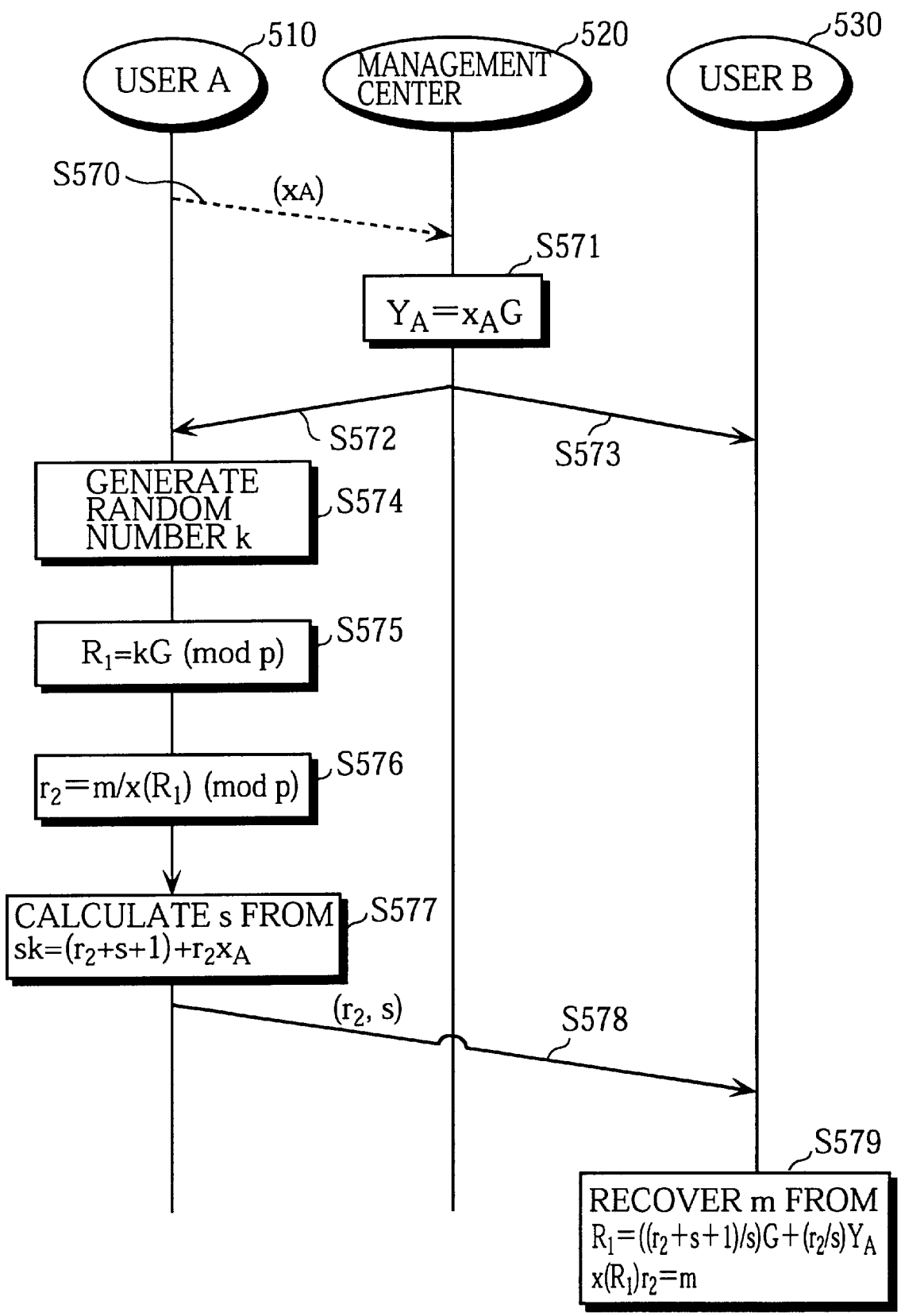
FIG. 6 is a sequential view showing the message recovery signature algorithm and data exchange in the second embodiment.

FIG. 6 shows the message recovery signature algorithm and data exchange between the three parties (user A 510, management center 520, and user B 530) in the present system and corresponds to FIG. 5 of the first embodiment.
<System Conditions>

The system conditions of the message recovery signature scheme used in the present system are as follows.

The message recovery signature scheme in this system is a public key cryptosystem that uses the discrete logarithm problem as the founding principle for the security, and is based on operations over an elliptic curve E(GF(p)) defined on a finite field GF(p) where p is a prime number.

An elliptic curve referred to here is a function that is generally expressed as $y^2=x^3+ax+b$, with E(GF(p)) denoting the set of points (x,y) that are elements of GF(p) and are present on the elliptic curve. The discrete logarithm problem based on the elliptic curve E(GE(p)) is as follows. Let Q and G be elements of E(GF(p)). The problem is to find a natural number d that satisfies the relationship $$Q=dG \quad \text{(Equation 3.1)}$$

This calculation is extremely difficult when, for instance, G or p is a decimal number of about 30 digits. Which is to say, the difficulty of the discrete logarithm problem over the elliptic curve E(GF(p)) far exceeds the discrete logarithm problem over the finite field GF(p), if both problems deal with values of the same number of digits. This implies that the discrete logarithm problem based on an elliptic curve achieves the level of security similar to the discrete logarithm problem based on a finite field, with the smaller number of digits (for example, 160 bits in E(GF(p)) whereas 1024 bits in GF(p)).

Note here that the present embodiment uses such an elliptic curve that p of the defining field GF(p) is equal to the order of G.

Let a signature equation be $$ha(r_2',s,1)k=hb(r_2'ks,1)+hc(r_2',s,1)x_A (\text{mod } q) \quad \text{(Equation 3.2)}$$

where ha, hb, and hc are maps from GF(p)×GF(p)×GF(p) to GF(p) and are set in this embodiment as $$ha(r_2',s,1)=s \quad \text{(Equation 3.3)}$$

$$hb(r_2',s,1)=r_2'+s+1(\text{mod } q) \quad \text{(Equation 3.4)}$$

$$hc(r_2',s,1)=r_2' \quad \text{(Equation 3.5)}$$

<Public Key Generation>

First, the management center 520 uses the user A's secret key $x_A$ which has been informed by the user A 510 beforehand (S570) to generate a public key $y_A$ of the user A 510 according to $$Y_A=x_AG \quad \text{(Equation 3.6)}$$

(S571). The management center 520 then reveals the system parameters (p, E, G, ha, hb, hc) to the user A 510 and user B 530, as well as informing the user B 530 of the user A's public key $Y_A$ (S572 and S573).
<Signature and Transmission>

(Step S574)

The user A 510 receives the system parameters and stores them in the system parameter storing unit 514. To place an order with the user B 530 for a product, the user A 510 first generates a random number k.

(Step S575)

The user A 510 then finds a commitment $R_1$ by computing $$R_1=kG(\text{mod } p) \quad \text{(Equation 3.7)}$$

on the elliptic curve E(GF(p)).

(Step S576)

The user A 510 also calculates $r_2$ as follows $$\begin{aligned}r_2 &= F(R_1, m) \\ &= m/x(R_1) \ (\text{mod } p)\end{aligned} \quad \text{(Equation 3.8)}$$

where $x(R_1)$ denotes the x coordinate of the point $R_1$.

(Step S577)

The user A 510 further solves s from the signature equation $$ha(r_2',s,1)k=hb(r_2',s,1)+hc(r_2',s,1)x_A(\text{mod } q) \quad \text{(Equation 3.9)}$$

i.e.

$$sk=(r_2+s+1)+r_2x_A(\text{mod } q) \quad \text{(Equation 3.10)}$$

(Step S578)

Lastly, the user A 510 sends a ciphertext $(r_2,s)$ to the user B 530.

<Message Recovery>

On receiving the system parameters and ciphertext $(r_2,s)$, the user B 530 finds $R_1$ from $$R_1 = kG = ((r_2 + s + 1)/s) + (r_2/s)Y_A$$

(Equation 3.11)

and recovers the message m using $R_1$ according to $$x(R_1)r_2 = m$$

(Equation 3.12)

(S579), where Equation 3.12 can be written as $$m = x(R_1)r_2 = x(kG)r_2 = x(((r_2+s+1)/s)G + (r_2/s)Y_A)r_2$$

(Equation 3.13)

If the recovered message m is an intelligible order, the user B 530 authenticates the message as being sent from the user A 510.

With the message recovery signature scheme of the present embodiment, the four attacks which are valid against the conventional scheme can be prevented essentially for the same reason as the first embodiment. However, the message recovery signature apparatus of the second embodiment differs with the first embodiment in that the discrete logarithm problem is defined on the elliptic curve E(GF(p)) and not on the finite field GF(p).

Which is to say, in the second embodiment the commitment $R_1$ is not directly related to the message m as in Equation 1.5 in the conventional scheme but is related to m through the x coordinate, as shown in Equation 3.8. The function F in Equation 3.8 has a property that, for the elements g, $y_A$, and m of GF(p) and elements t, j, and e of $Zq=\{0, 1, \ldots, q-1\}$, the three variables t, j, and e cannot be replaced with two algebraic relations in $F(tG+jY_A, m \times x(eY_A))$ and $F(tG+jY_A, m \times x(eG))$. . . . (Condition 2).

Also, defining the inverse map of $r_2 = F(R_1, m)$ for the elements $R_1$, G, and $y_A$ of E(GF(p)) and elements $r_2$ and m of GF(p) as $$m = F^{-1}(R_1, r_2)$$

(Equation 3.14)

leads to $$F^{-1}(R_1-G, r_2) \neq \phi(m, G)$$
$$F^{-1}(R_1-Y_A, r_2) \neq \phi(m, Y_A)$$

(Equation 3.15)

with respect to arbitrary functions φ and φ of two variables, respectively. Hence the recovery-equation attack and the homomorphism attack can be avoided.

Furthermore, in the message recovery signature scheme of the present embodiment a set of coefficients (a,b,c) in the signature equation is determined using the maps ha, hb, and hc, whereas in the conventional scheme (a,b,c) is a permutation of $(r_2',s,1)$ as shown in Equation 1.8. Assume that $r_2$ and s are elements of Zq, then ha, hb, and hc satisfy the next two conditions for every $rr_2'$ and ss aside from a few prefixed values.

(1) If $ha(r_2',s,1)=ha(rr_2',ss,1)$ and $hc(r_2',s,1)=hc(rr_2',ss,1)$, then $$hb(r_2',s,1)-ha(r_2',s,1) \neq hb(rr_2',ss,1)$$

(Equation 3.16)

(2) If $ha(r_2',s,1)=ha(rr_2',ss,1)$ and $hb(r_2',s,1)=hb(rr_2',ss,1)$, then $$hc(r_2',s,1)-ha(r_2',s,1) \neq hc(rr_2',ss,1)$$

(Equation 3.17)

Hence the signature equation attack is invalid. The signature equation of the present embodiment is also strong against the conventional cryptanalysis that uses proportional relations, since the equation cannot be decomposed into two terms.

Also, the present embodiment uses such an elliptic curve that the order of G is equal to p of the defining field GF(p), so that the redundancy attack can be avoided without adding the step for limiting the value of $r_2$ as in the first embodiment.

While the x coordinate has been used in the above embodiment, any map that satisfies Condition 2 may instead be used, though it is preferable to use a map, such as the x coordinate, whose computation amount is small.

Also, the maps ha, hb, and hc are not limited to those used in the above embodiment but any maps that satisfy Equations 3.16 and 3.17 can be used, though it is desirable to use a map with a small computation amount in order to strengthen the security against the conventional cryptanalysis which uses proportional relations.

While such an elliptic curve that p of the defining field GF(p) becomes equal to the order of G has been used in the above embodiment, a normal elliptic curve may also be used. In this case, it is necessary to add the step for limiting the value of $r_2$ as in the first embodiment.

Also, incorporating the maps ha, hb, and hc into a message recovery signature scheme different with the conventional scheme can produce the same effect as the above embodiment.

The message recovery signature scheme described in the above embodiment has been based on operations over E(GF(p)). However, it is also possible to use a generalized message recovery signature scheme based on operations over $E(GF(p^r))$ where p is a prime number, r is a positive integer, G is an element whose order is q, since if p is a prime number then $GF(p^r)$ forms a finite field.

In such a case, it suffices to introduce a function π mapping $GF(p^r)$ into a finite ring $Zp^r=\{0, 1, \ldots p^{r-1}\}$ and replace $r_2$ in the signature equation in step S577 with $\pi(r_2)$ obtained by converting $r_2$ in step S576 by the function π. In other words, the second embodiment corresponds to a special case where r=1 in signature schemes-defined over $E(GF(p^r))$.

The signature scheme of the second embodiment can also be modified in such a way that, instead of signing the message m the sender signs a hash value obtained by converting the message by a hash function and sends the signature to the recipient along with the message, and the recipient recovers the hash value from the signature to authenticate the message.

Third Embodiment

The following is a description of the third embodiment of the products trading system that uses the message recovery signature apparatus of the present invention.

The products trading system of the third embodiment has the same function as the first embodiment but differs with the first embodiment in implementations of the signature apparatus 510, the management center 520, and the recovery apparatus 530.

To be more specific, the message recovery signature in the first embodiment has been realized by software whereby the processors 512, 522, and 532 in the respective apparatuses 510, 520, and 530 have the calculating units 512*a*, 522*a*, and 532*a* perform various operations according to the programs stored in the respective controlling ROMs 512*b*, 522*b*, and 532*b*. On the other hand, the message recovery signature in the third embodiment is realized by dedicated hardware equipped in each of the apparatuses 510, 520, and 530.

Hence the following description will focus on the internal constructions of the apparatuses 510, 520, and 530.

Figure 7:
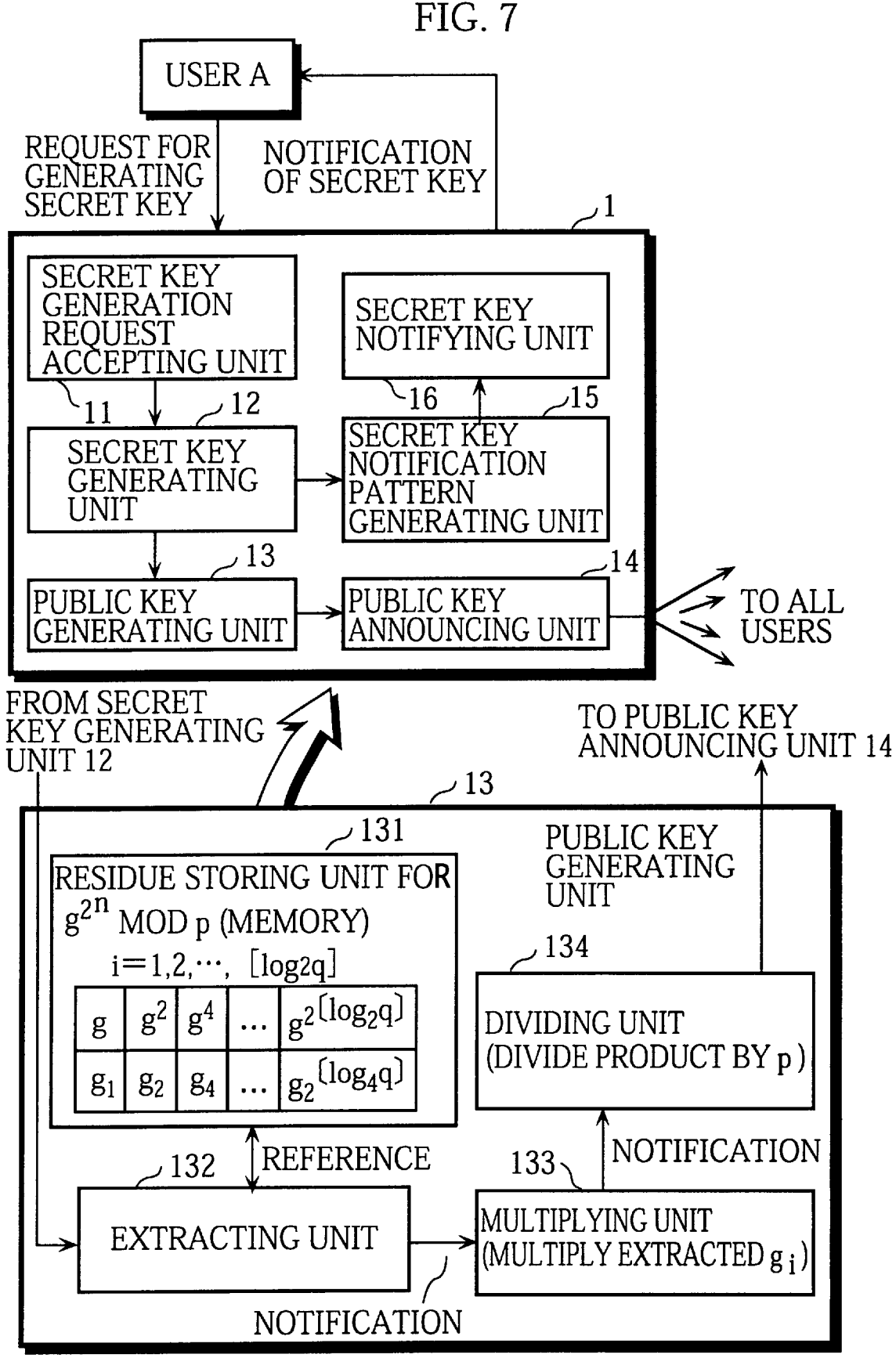
FIG. 7 is a block diagram showing the construction of a management center 1 of the third embodiment.

FIG. 7 is a block diagram showing the construction of a management center 1 of the third embodiment. The figure corresponds to the case where the management center 520 of the first embodiment is configured by dedicated hardware.

This management center 1 is roughly made up of a secret key generation request accepting unit 11, a secret key generating unit 12, a public key generating unit 13, a public key announcing unit 14, a secret key notification pattern generating unit 15, and a secret key notifying unit 16.

Of these components of the management center 1, the public key generating unit 13 is illustrated in details in the lower part of the figure.

The public key generating unit 13 includes a residue storing unit 131 for storing residues $g_i$ of $2^n$-powers of g modulo p in advance, an extracting unit 132 for extracting residues from the residue storing unit 131, a multiplying unit 133 for multiplying the extracted residues together, and a dividing unit 134 for dividing the multiplication result by p.

The above components of the management center 1 operate as follows.

The secret key generation request accepting unit 11 accepts a unique secret key generation request which has been made by each user in the system (user A in the case of the first embodiment) through a keyboard or the like. The secret key generating unit 12 generates a binary random number according to a stored random number generating program in response to the accepted request, the generated random number being set as the secret key of the user who made the request. In the present embodiment the user's identification number on a public digital communication network is used in random number generation to avoid generating the same random number for different users. The public key generating unit 13 generates a public key using the random number generated by the secret key generating unit 12.

The public key announcing unit 14 announces the generated public key to all users in the system together with the user name corresponding to the public key. Here, if an inquiry is made by any of the users in the system, the public key announcing unit 14 accordingly announces a required user name and its public key among public keys generated in the management center 1 for users in the system. The secret key notification pattern generating unit 15 protects secret keys of the users in the system from being accidentally revealed due to misoperations. The secret key notifying unit 16 uses the secret keys when the need, such as for generating a shared key, arises.

The public key generation by the public key generating unit 13 is explained in details below.

The residue storing unit 131 calculates $2^n$-powers of g (g, $g^2$, $g^4$, $g^8$, ...) modulo p and stores residues ($g_1$, $g_2$, ..., $g_i$) in a ROM beforehand. Take small numbers as an example. When p=11 and g=2, i=[$\log_2$ 11]=3, i.e. $2^3$<11, so that 2, $2^2$, and $2^4$ are stored as g, $g^2$, and $g^4$ along with 2, 4, and 5 as $g_1$, $g_2$, and $g_4$ corresponding to g, $g^2$, and $g^4$.

The extracting unit 132 receives the binary secret key from the secret key generating unit 12 and extracts $g_1$, $g_2$, ..., $g_i$ corresponding to the digits where 1 is set in the received secret key. Take a small number as an example. Assume $x_A$=101 (5 in decimal) with 1 being set in the first and third digits (corresponding to the $2^0$-power of g and $2^2$-power of g). Then $g_1$ and $g_4$, i.e. 2 and 5, are extracted.

The multiplying unit 133 multiplies the residues extracted by the extracting unit 132 together. The dividing unit 134 divides the multiplication result by p to obtain the residue. For instance, $2^a=2^5=2 \times 2^4=2 \times 5=10 \pmod{11}$. The obtained residue is then set as the public key. Note that the use of powers of g in the present embodiment stems from the fact that such operations are usually faster than operations modulo $g_3$ or $g_5$ and the calculators perform binary arithmetic operations.

Figure 8:
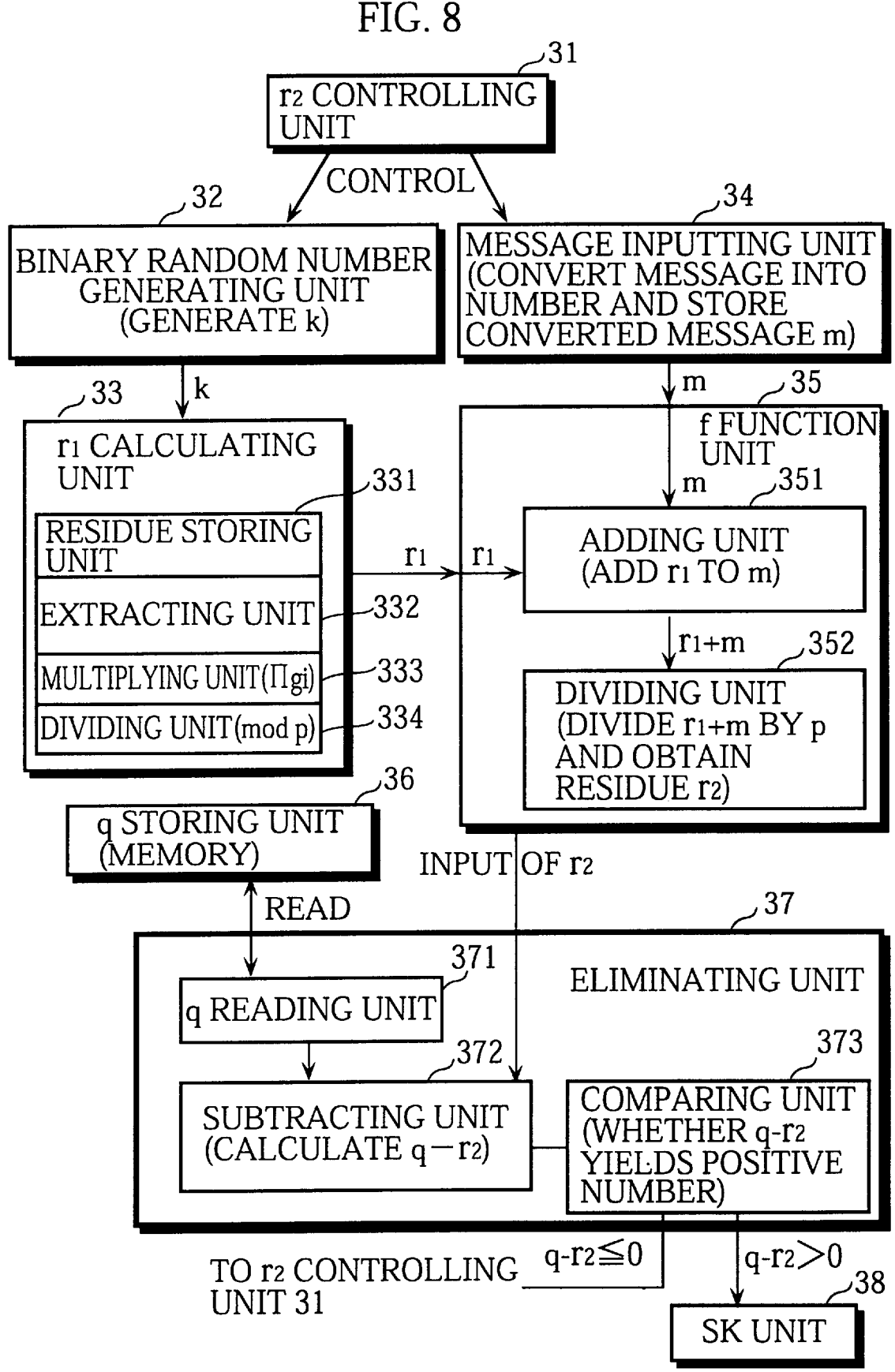
FIG. 8 is a block diagram showing the construction of a message recovery signature apparatus (user A) of the third embodiment.

FIG. 8 is a block diagram showing the construction of a message recovery signature apparatus of the user A in the third embodiment. The figure corresponds to the case where the signature apparatus (user A) 510 of the first embodiment is configured by dedicated hardware.

The signature apparatus is roughly made up of a $r_2$ controlling unit 31, a binary random number generating unit 32, a $r_1$ calculating unit 33, a message (m) inputting unit 34, a f function unit 35, a q storing unit 36, an eliminating unit 37, and a SK unit 38.

The $r_1$ calculating unit 33 includes a residue storing unit 331, an extracting unit 332, a multiplying unit 333, and a dividing unit 334. The f function unit 35 includes an adding unit 351 and a dividing unit 352. The eliminating unit 37 includes a q reading unit 371, a subtracting unit 372, and a comparing unit 373.

Figure 9:
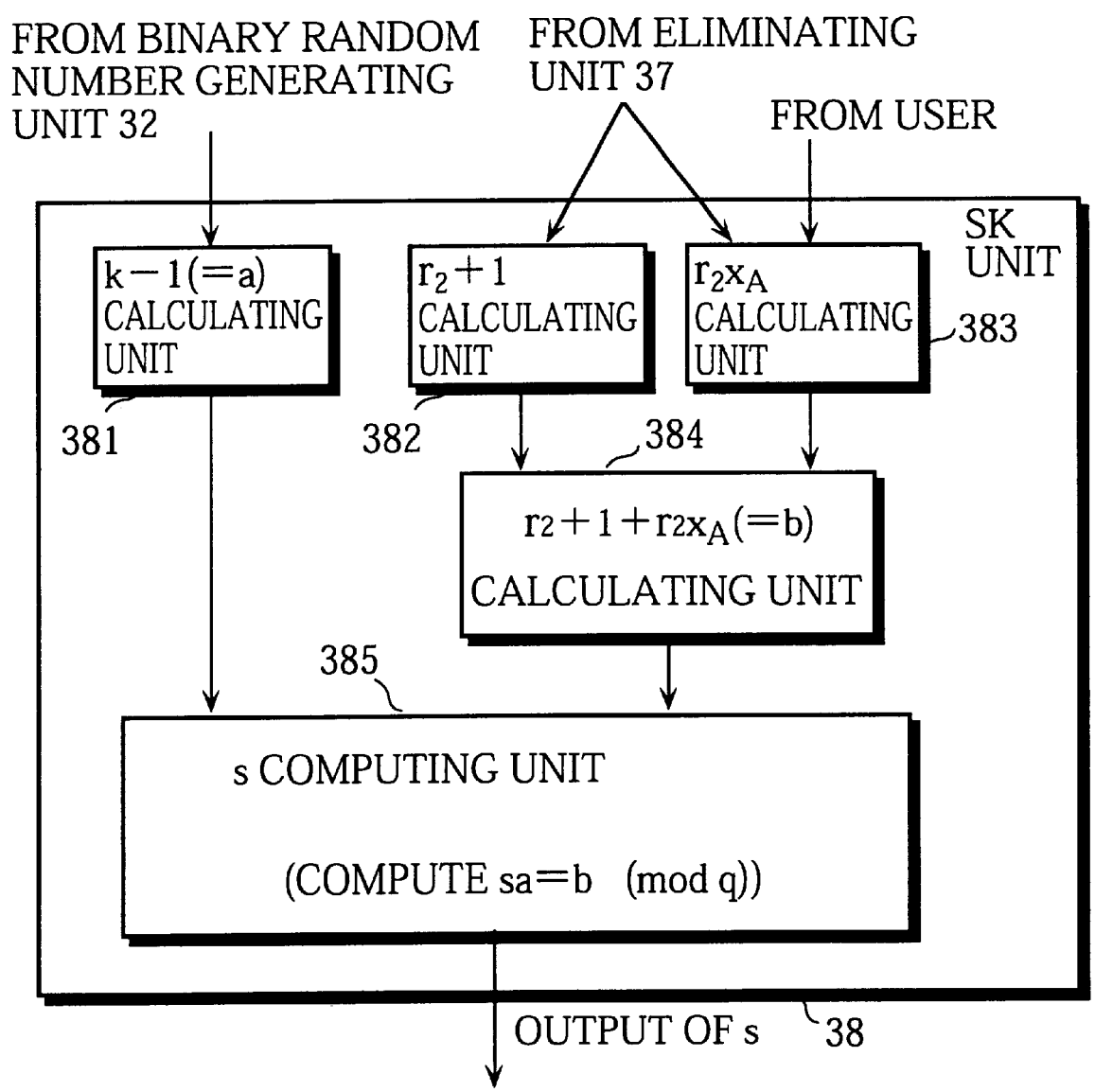
FIG. 9 is a block diagram showing the detailed construction of a SK unit 38 shown in FIG. 8.

The SK unit 38 includes a k−1 calculating unit 381, a $r_2$+1 calculating unit 382, a $r_2 x_A$ calculating unit 383, a $r_2+1+r_2 x_A$ calculating unit 384, and a s computing unit 385, as shown in FIG. 9.

The above components of the signature apparatus operate as follows.

The $r_2$ controlling unit 31 adjusts and controls the binary random number generating unit 32 and the message inputting unit 34 on signature transmission. The $r_2$ controlling unit 31 also performs the loop processing corresponding to steps S554~S556 of the first embodiment.

The message inputting unit 34 converts a message inputted by the user into a number.

The binary random number generating unit 32 generates a unique random number k for creating a commitment whenever a message is to be sent. Here, data such as the transmission date and time is used to generate a different random number each time.

The $r_1$ calculating unit 33 solves $r_1$ from $r_1=g^k \pmod{p}$ using the generated binary random number k. To do so, the $r_1$ calculating unit 33 is equipped with the residue storing unit 331, extracting unit 332, multiplying unit 333, and dividing unit 334 which have the same constructions and functions respectively as the residue storing unit 131, extracting unit 132, multiplying unit 133, and dividing unit 134 in the management center 1.

The f function unit 35 finds $r_2$ by calculating $r_2=f(r_1,m) \pmod{p}$ using the message mask equation f, based on $r_1$ obtained by the $r_1$ calculating unit 33 and the message m converted by the message inputting unit 34. To do so, the f function unit 35 is equipped with the adding unit 351 for calculating $r_1$+m and the dividing unit 352 for dividing $r_1$+m by p to obtain the residue $r_2$.

The q storing unit 36 is a memory for storing q which has been notified by the management center 1.

The eliminating unit 37 compares q with $r_2$ inputted from the f function unit 35. If $q \leq r_2$, the eliminating unit 37 notifies the $r_2$ controlling unit 31 of the comparison result.

The $r_2$ controlling unit 31 accordingly has the binary random number generating unit 32 generate a unique random number to acquire new $r_1$ different from previous $r_1$, has the f function unit 35 find new $r_2$ using new $r_1$ and the message m according to the f function, and has the eliminating unit 37 compare q with $r_2$. This process is repeated until $q-r_2$ yields a positive value. If $q-r_2$ yields a positive value, the eliminating unit 37 outputs $r_2$ to the SK unit 38. To do so, the eliminating unit 37 is equipped with the q reading unit 371, the subtracting unit 372, and the comparing unit 373.

More specifically, the q reading unit 371 reads q from the q storing unit 36 when $r_2$ is inputted and passes q to the subtracting unit 372. The subtracting unit 372 subtracts $r_2$ from q. If the difference obtained by the subtracting unit 372 is no larger than 0, the comparing unit 373 notifies the $r_2$ controlling unit 31 of the comparison result. The above process is repeated until the calculation by the subtracting unit 372 yields a positive value. If the calculation result is a positive value, the comparing unit 373 passes $r_2$ to the SK unit 38.

The SK unit 38 computes the signature equation $sk=(r_2+s+1)+r_2x_A(mod\ q)$ to form the transmission message.

To be more specific, the k−1 calculating unit 381 subtracts 1 from the random number k which has been generated by the binary random number generating unit 32 and which satisfies the condition that $r_2$ obtained using k is smaller than q. The k−1 calculating unit 381 then outputs the subtraction result a. The $r_2+1$ calculating unit 382 adds 1 to $r_2$ inputted from the eliminating unit 37. The $r_2x_A$ calculating unit 383 finds the product $r_2x_A$ by multiplying $r_2$ by $x_A$ inputted by the user. The $r_2+1+r_2x_A$ calculating unit 384 gets the sum b by adding $r_2+1$ inputted from the $r_2+1$ calculating unit 382 to $r_2x_A$ inputted from the $r_2x_A$ calculating unit 383. The s computing unit 385 uses a obtained by the k−1 calculating unit 381 and b obtained by the $r_2+1+r_2\ x_A$ calculating unit 384 to determine s that satisfies $s\cdot a=b(mod\ q)$ according to the Euclidean algorithm. The s computing unit 385 then passes s to a transmitting unit (not shown in the figure).

Figure 10:
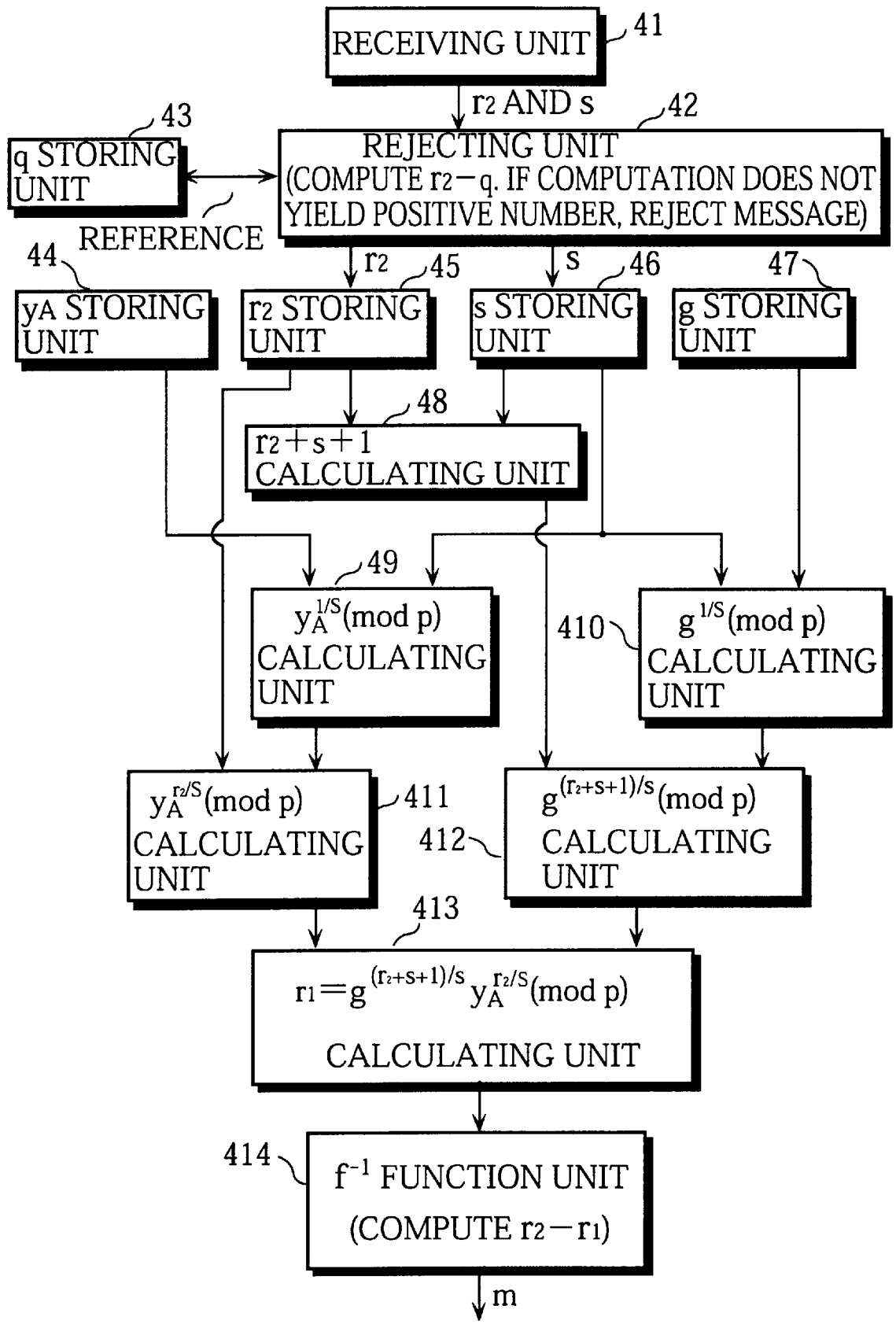
FIG. 10 is a block diagram showing the construction of a recovery apparatus (user B) of the third embodiment.

FIG. 10 is a block diagram showing the construction of a recovery apparatus of the user B in the third embodiment. The figure corresponds to the case where the recovery apparatus 530 of the user B in the first embodiment is configured by dedicated hardware.

The recovery apparatus is mainly made up of a receiving unit 41, a rejecting unit 42, a q storing unit 43, a $y_A$ storing unit 44, a $r_2$ storing unit 45, a s storing unit 46, a g storing unit 47, a $r_2+s+1$ calculating unit 48, a $y_A^{1/s}(mod\ p)$ calculating unit 49, a $g^{1/s}(mod\ p)$ calculating unit 410, a $y_A^{r2/s}(mod\ p)$ calculating unit 411, a $g^{(r2+s+1)/s}(mod\ p)$ calculating unit 412, a $r_1=g^{(r2+s+1)/s}y_A^{r2/s}(mod\ p)$ calculating unit 413, and a $f^{-1}$ function unit 414.

The above components of the recovery apparatus operate as follows.

The receiving unit 41 receives a ciphertext $(r_2,s)$ from the user A.

The rejecting unit 42 computes $r_2-q$ once the ciphertext has been received. If the computation result is a positive number, the rejecting unit 42 provisionally verifies the received ciphertext as authentic and passes it to the other components for subsequent processing. If, on the other hand, the computation result is not a positive number, the rejecting unit 42 rejects the ciphertext. The q storing unit 43 prestores q for the above computation as in the signature apparatus. The $y_A$ storing unit 44 prestores $y_A$ which has been revealed by the management center 1.

The g storing unit 47 prestores g.

The $r_2$ storing unit 45 stores $r_2$ of the ciphertext which has been provisionally authenticated by the rejecting unit 42.

The s storing unit 46 stores s in a like manner. Here, the ciphertext is divided into $r_2$ and s based on a separately specified protocol.

The $r_2+s+1$ calculating unit 48 reads $r_2$ and s respectively from the $r_2$ storing unit 45 and the s storing unit 46 and calculates $r_2+s+1$.

The $y_A^{1/s}(mod\ p)$ calculating unit 49 reads $y_A$ and s respectively from the $y_A$ storing unit 44 and the s storing unit 46 and calculates $y_A^{1/s}(mod\ p)$.

The $g^{1/s}(mod\ p)$ calculating unit 410 reads s and g respectively from the s storing unit 46 and the g storing unit 47 and calculates $g^{1/s}(mod\ p)$.

The $y_A^{r2/s}(mod\ p)$ calculating unit 411 reads $r_2$ and $y_A^{1/s}(mod\ p)$ respectively from the $r_2$ storing unit 45 and the $y_A^{1/s}(mod\ p)$ calculating unit 49, raises $y_A^{1/s}(mod\ p)$ to "$r_2$"th power, and finds the residue of $y_A^{r2/s}$ modulo p.

The $g^{(r2+s+1)/s}(mod\ p)$ calculating unit 412 reads $r_2+s+1$ and $g^{1/s}(mod\ p)$ respectively from the $r_2+s+1$ calculating unit 48 and the $g^{1/s}(mod\ p)$ calculating unit 410, raises $g^{1/s}(mod\ p)$ to "$(r_2+s+1)$"th power, and finds the residue of $g^{(r2+s+1)/s}$ modulo p.

The $r_1=g^{(r2+s+1)/s}y_A^{r2/s}(mod\ p)$ calculating unit 413 solves $r_1$ by calculating $r_1=g^{(r2+s+1)/s}y_A^{r2/s}(mod\ p)$, using the calculation results of the $y_A^{r2/s}(mod\ p)$ calculating unit 411 and $g^{(r2+s+1)/s}(mod\ p)$ calculating unit 412.

The $f^{-1}$ function unit 414 computes $r_2-r_1$ using the function $f^{-1}$ to recover the message m.

The operation of the present system with the above construction is the same as the first embodiment shown in the sequential view of FIG. 5, so that its explanation is omitted here.

Note that such functional partitioning as the present embodiment for the first embodiment is also applicable to the second embodiment. In other words, the message recovery signature defined over the elliptic curve E(GF(p)) can be implemented both by software and hardware as is the case of the message recovery signature over the finite field GF(p).

As is evident from the above three embodiments, the present invention achieves a secure message recovery signature scheme that can prevent the above four attacks which the conventional scheme cannot, only by adding a negligible computation amount to the conventional scheme. In this sense, the message recovery signature apparatus of the present invention is highly valuable in the contemporary and coming era of widespread communication technologies such as the Internet and portable phones.

Industrial Applicability

The present invention can be applied to communication terminals for business network systems such as the electronic money and electronic commerce, with it being possible to strengthen the communication' security and invigorate the business trading.

The present invention is also applicable to communications, such as online filing of a patent application with a patent office, where the communicated contents have to be concealed and the authenticity of the sender has to be attested by a signature or impression. By doing so, unauthorized attacks by forgers can be prevented and procedures will be conducted smoothly.

The present invention can also be used for digital modulation radios such as portable phones, thereby assuring privacy and information security.

Further, the present invention can be applied to electronic mail or file transfer on the Internet. By doing so, it is possible to prevent tapping and other unauthorized acts by forgers and ensure information security in the sophisticated information society.

What is claimed is:

1. A message recovery signature apparatus for signing a message m with a secret key $x_A$ using a discrete logarithm problem as a basis for security, based on operations performed on a finite field GF(p) where p is a prime number and g is an element whose order is q, the message recovery signature apparatus comprising:

random number generating means for generating a random number k;

commitment generating means for generating a commitment $r_1$ from the random number k according to a function $f_{11}(k)=g^k$;

message masking means for generating a masked message $r_2$ from the commitment $r_1$ and the message m according to a function $f_{12}(r_1,m)$ that maps GF(p)×GF(p) into the finite field GF(p); and signature generating means for generating a signature s from the masked message $r_2$ and the secret key $x_A$ according to a function $f_{13}(r_2,x_A)=s$, wherein $$r_2'=r_2(\bmod\ q)$$

and satisfies $$ha(r_2',s,1)k=hb(r_2',s,1)+hc(r_2',s,1)x_A(\bmod\ q)$$

wherein the functions $ha(r_2',s,1)$, $hb(r_2',s,1)$, and $hc(r_2',s,1)$ define a mapping from Zq×Zq×Zq into Zq where Zq={0, 1, ..., q−1}, and when $r_2'$ and s are elements of Zq, the functions $ha(r_2',s,1)$, $hb(r_2',s,1)$, and $hc(r_2',s,1)$ satisfy conditions (1) and (2):
(1) if $ha(r_2',s,1)=ha(rr_2',ss,1)$ and $hc(r_2',s,1)=hc(rr_2',ss,1)$, then $hb(r_2',s,1)-ha(r_2',s,1)\neq hb(rr_2',ss,1)$
(2) if $ha(r_2',s,1)=ha(rr_2',ss,1)$ and $hb(r_2',s,1)=hb(rr_2',ss,1)$, then $hc(r_2',s,1)-ha(r_2',s,1)\neq hc(rr_2,ss,1)$ for every $rr_2'$ and ss except predetermined values, the message recovery signature apparatus being characterized by $f_{12}(r_1,m)=r_1+m$.

2. A message recovery signature apparatus for signing a message m with a secret key $x_A$ using a discrete logarithm problem as a basis for security, based on operations performed on a finite field GF(p$^r$) where p is a prime number, r is a positive integer, and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{14}(k)=g^k$;

message masking means for generating a masked message $r_2$ from the commitment $r_1$ and the message m according to a function $f_{15}(r_1,m)$ that maps GF(p$^r$)×GF(p$^r$) into the finite field GF(p$^r$);

converted message generating means for generating a converted message $rc_2$ from the masked message $r_2$ according to a function $f_{16}(r_2)$ that maps the finite field GF(p$^r$) into a finite ring Zp$^r$={0, 1, ..., p$^{r-1}$}, wherein $f_{16}(r_2)=\pi(r_2)$, and wherein when $\{\alpha_1, \alpha_2, \ldots \alpha_r\}$ are base points on GF(p) of the finite field GF(p$^r$) and $\{x_1, x_2, \ldots, x_r\}$ are elements of GF(p), $$\pi(x)=x_1+x_2p+\ldots+x_rp^{r-1}$$

for an element $x=x_1\alpha_1=-\ldots+x_r\alpha_r$ of the finite field GF(p$^r$); and signature generating means for generating a signature s from the converted message $rc_2$ and the secret key $x_A$ according to a function $f_{17}(rc_2,x_A)=s$ wherein $$rc_2'=rc_2(\bmod\ q),$$

and satisfies $$ha(rc_2',s,1)k=hb(rc_2',s,1)+hc(rc_2',s,1)x_A(\bmod\ q)$$

wherein the functions $ha(rc_2',s,1)$, $hb(rc_2',s,1)$, and $hc(rc_2',s,1)$ are maps from Zq×Zq×Zq into Zq where Zq={0, 1, ..., q−1}, and when $rc_2'$ and s are elements of Zq, the functions $ha(rc_2',s,1)$, $hb(rc_2',s,1)$, and $hc(rc_2',s,1)$ satisfy conditions (1) and (2):
(1) if $ha(rc_2',s,1)=ha(rrc_2',ss,1)$ and $hc(rc_2',ss,1)=hc(rrc_2',ss,1)$, then $hb(rc_2',s,1)-ha(rc_2',s,1)\neq hb(rrc_2',ss,1)$
(2) if $ha(rc_2',s,1)=ha(rrc_2',ss,1)$ and $hb(rc_2',s,1)=hb(rrc_2',ss,1)$, then $hc(rc_2',s,1)-ha(rc_2',s,1)\neq hc(rrc_2,ss,1)$ for every $rrc_2'$ and ss except predetermined values, the message recovery signature apparatus being characterized by $f_{15}(r_1,m)=r_1+m$.

3. A message recovery signature apparatus for signing a message m with a secret key $x_A$ using a discrete logarithm problem as a basis for security, based on operations performed on an elliptic curve E(GF(p)) defined over a finite field GF(p) where p is a prime number and G is an element whose order is q, the message recovery signature apparatus comprising:

secret key storing means for storing the secret key $x_A$;

random number generating means for generating a random number k;

commitment generating means for generating a commitment $R_1$ from the random number k according to a finction $F_{11}(k)=kG$;

message masking means for generating a masked message $r_2$ from the commitment $R_1$ and the message m according to a function $F_{12}(R_1,m)$ that maps E(GF(p))×GF(p) into the finite field GF(p); and signature generating means for generating a signature s from the masked message $r_2$ and the secret key $x_a$; according to a function $F_{13}(r_2,x_A)=s$, wherein $$r_2'=r_2(\bmod\ q)$$

and satisfies $$ha(r_2',s,1)k=hb(r_2',s,1)+hc(r_2',s,1)x_A(\bmod\ q)$$

wherein the functions $ha(r_2',s,1)$, $hb(r_2',s,1)$, and $hc(r_2',s,1)$ are maps from Zq×Zq×Zq into Zq where Zq={0, 1, ..., q−1}, and when $r_2'$ and s are elements of Zq, the functions $ha(r_2',s,1)$, $hb(r_2',s,1)$, and $hc(r_2',s,1)$ satisfy conditions (1) and (2):
(1) if $ha(r_2',s,1)=ha(rr_2',ss,1)$ and $hc(r_2',s,1)=hc(rr_2',ss,1)$, then $hb(r_2',s,1)-ha(r_2',s,1) \neq hb(rr_2',ss,1)$
(2) if $ha(r_2',s,1)=ha(rr_2',ss,1)$ and $hb(r_2',s,1)=hb(rr_2',ss,1)$, then $hc(r_2',s,1)-ha(r_2',s,1) \neq hc(rr_2,ss,1)$ for every $rr_2'$ and ss except predetermined values, the message recovery signature apparatus being characterized by $F_{12}(R_1,m)=$(x-coordinate of $R_1$)+m.

4. A message recovery signature apparatus for signing a message m with a secret key $x_A$ using a discrete logarithm problem as a basis for security, based on operations performed on an elliptic curve $E(GF(p^r))$ defined over a finite field $GF(p^r)$ where p is a prime number, r is a positive integer, and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{14}(k)=kG$;

message masking means for generating a masked message $r_2$ from the commitment $R_1$ and the message m according to a function $F_{15}(R_1,m)$, that maps $E(GF(p^r)) \times GF(p^r)$ into the finite field $GF(p^r)$;

converted message generating means for generating a converted message $rc_2$ from the masked message $r_2$ according to a function $F_{16}(r_2)$ that maps the finite field $GF(p^r)$ into a finite ring $Zp^r=\{0, 1 \ldots, p^{r-1}\}$, wherein $f_{16}(r_2)=\pi(r_2)$ and wherein when $\{\alpha_1, \alpha_2, \ldots \alpha_r\}$ are base points on GF(p) of the finite field $GF(p^r)$ and $\{x_1, x_2, \ldots, x_r\}$ are elements of GF(p), $$\pi(x)=x_1+x_2p+ \ldots +x_rp^{r-1}$$

for an element $x=x_1\alpha_1=- \ldots +x_r\alpha_r$ of the finite field $GF(p^r)$; and signature generating means for generating a signature s from the converted message $rc_2$ and the secret key $x_A$ according to a function $f_{17}(rc_2,x_A)=s$ wherein $$rc_2'=rc_2(\bmod\ q),$$

and satisfies $$ha(rc_2',s,1)k=hb(rc_2',s,1)+hc(rc_2',s,1)x_A(\bmod\ q)$$

wherein the functions $ha(rc_2',s,1)$, $hb(rc_2',s,1)$, and $hc(rc_2',s,1)$ are maps from $Zq \times Zq \times Zq$ into Zq where $Zq=\{0, 1, \ldots, q-1\}$, and when $rc_2'$ and s are elements of Zq, the functions $ha(rc_2',s,1)$, $hb(rc_2',s,1)$, and $hc(rc_2',s,1)$ satisfy conditions (1) and (2):
(1) if $ha(rc_2',s,1)=ha(rrc_2',ss,1)$ and $hc(rc_2',ss,1)=hc(rrc_2',ss,1)$, then $hb(rc_2',s,1)-ha(rc_2',s,1) \neq hb(rrc_2',ss,1)$
(2) if $ha(rc_2',s,1)=ha(rrc_2',ss,1)$ and $hb(rc_2',s,1)=hb(rrc_2',ss,1)$, then $hc(rc_2',s,1)-ha(rc_2',s,1) \neq hc(rrc_2,ss,1)$ for every $rrc_2'$ and ss except predetermined values, the message recovery signature apparatus being characterized by $F_{15}(R_1,m)=$(x-coordinate of $R_1$)+m.

5. A message recovery signature apparatus for signing a message m with a secret key $x_A$ using a discrete logarithm problem as a basis for security, based on operations performed on a finite field GF(p) where p is a prime number and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{21}(k)=g^k$;

message masking means for generating a masked message $r_2$ from the commitment $r_1$ and the message m according to a function $f_{22}(r_1,m)$ that maps $GF(p) \times GF(p)$ into the finite field GF(p), wherein the function $f_{22}(r_1,m)$ has an inverse function $f^{-1}_{22}(r_1,f_{22}(r_1,m))=m$;

signature message generating means for generating a signature message $r_2'$ from the masked message $r_2$ according to a function $f_{23}(r_2)=r_2'(\bmod\ q)$; and signature generating means for calculating, when $Zq=\{0, 1, \ldots, q-1\}$ is a finite ring and ha, hb, and hc are functions that map $Zq \times Zq \times Zq$ into Zq, a signature s which satisfies $$ha(r_2',s,1)k=hb(r_2',s,1)+hc(r_2',s,1)x_A(\bmod\ q)$$

the message recovery signature apparatus being characterized in that the function ha satisfies $ha(r_2',s,1)=r_2'$, the function hb satisfies $hb(r_2',s,1)=r_2'+s+1$, and the function hc satisfies $hc(r_2',s,1)=s$.

6. A message recovery signature apparatus for signing a message m with a secret key $x_A$ using a discrete logarithm problem as a basis for security, based on operations performed on a finite field GF(p) where p is a prime number and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{21}(k)=g^k$;

message masking means for generating a masked message $r_2$ from the commitment $r_1$ and the message m according to a function $f_{22}(r_1,m)$ that maps $GF(p) \times GF(p)$ into the finite field GF(p), wherein the function $f_{22}(r_1,m)$ has an inverse function $f^{-1}_{22}(r_1,f_{22}(r_1,m))=m$;

signature message generating means for generating a signature message $r_2'$ from the masked message $r_2$ according to a function $f_{23}(r_2)=r_2'(\bmod\ q)$; and signature generating means for calculating, when $Zq=\{0, 1, \ldots, q-1\}$ is a finite ring and ha, hb, and hc are functions that map $Zq \times Zq \times Zq$ into Zq, a signature s which satisfies $$ha(r_2',s,1)k=hb(r_2',s,1)+hc(r_2',s,1)x_A(\bmod\ q)$$

the message recovery signature apparatus being characterized in that the function ha satisfies $ha(r_2',s,1)=s$, the function hb satisfies $hb(r_2',s,1)=r_2'+s+1$, and the function hc satisfies $hc(r_2',s,1)=r_2'$.

7. A message recovery signature apparatus for signing a message m with a secret key $x_A$ using a discrete logarithm problem as a basis for security, based on operations performed on a finite field GF(p) where p is a prime number and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{21}(k)=g^k$;

message masking means for generating a masked message $r_2$ from the commitment $r_1$ and the message m according to a function $f_{22}(r_1,m)$ that maps GF(p)×GF(p) into the finite field GF(p), wherein the function $f_{22}(r_1,m)$ has an inverse function $f^{-1}{}_{22}(r_1,f_{22}(r_1,m))=m$;

signature message generating means for generating a signature message $r_2'$ from the masked message $r_2$ according to a function $f_{23}(r_2)=r_2'(\bmod\ q)$; and signature generating means for calculating, when Zq={0, 1, . . . , q−1} is a finite ring and ha, hb, and hc are functions that map Zq×Zq×Zq into Zq, a signature s which satisfies $$ha(r_2',s,1)k=hb(r_2',s,1)+hc(r_2',s,1)x_A(\bmod\ q)$$

the message recovery signature apparatus being characterized in that the function ha satisfies $ha(r_2',s,1)=s$, the function hb satisfies $hb(r_2',s,1)=r_2'$, and the function hc satisfies $hc(r_2',s,1)r_2'+s+1$.

8. A message recovery signature apparatus for signing a message m with a secret key $x_A$ using a discrete logarithm problem as a basis for security, based on operations performed on a finite field GF(p) where p is a prime number and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{21}(k)=g^k$;

message masking means for generating a masked message $r_2$ from the commitment $r_1$ and the message m according to a function $f_{22}(r_1,m)$ that maps GF(p)×GF(p) into the finite field GF(p), wherein the function $f_{22}(r_1,m)$ has an inverse function $f^{-1}{}_{22}(r_1,f_{22}(r_1,m))=m$;

signature message generating means for generating a signature message $r_2'$ from the masked message $r_2$ according to a function $f_{23}(r_2)=r_2'(\bmod\ q)$; and signature generating means for calculating, when Zq={0, 1, . . . , q−1} is a finite ring and ha, hb, and hc are functions that map Zq×Zq×Zq into Zq, a signature s which satisfies $$ha(r_2',s,1)k=hb(r_2',s,1)+hc(r_2',s,1)x_A(\bmod\ q)$$

the message recovery signature apparatus being characterized in that the function ha satisfies $ha(r_2',s,1)=r_2'$, the function hb satisfies $hb(r_2',s,1)=s$, and the function hc satisfies $hc(r_2',s,1)=r_2'+s+1$.

9. A message recovery signature apparatus for signing a message m with a secret key $x_A$ using a discrete logarithm problem as a basis for security, based on operations performed on a finite field GF(p) where p is a prime number and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{21}(k)=g^k$;

message masking means for generating a masked message $r_2$ from the commitment $r_1$ and the message m according to a function $f_{22}(r_1,m)$ that maps GF(p)×GF(p) into the finite field GF(p), wherein the function $f_{22}(r_1,m)$ has an inverse function $f^{-1}{}_{22}(r_1,f_{22}(r_1,m))=m$;

signature message generating means for generating a signature message $r_2'$ from the masked message $r_2$ according to a function $f_{23}(r_2)=r_2'(\bmod\ q)$; and signature generating means for calculating, when Zq={0, 1, . . . , q−1} is a finite ring and ha, hb, and hc are functions that map Zq×Zq×Zq into Zq, a signature s which satisfies $$ha(r_2',s,1)k=hb(r_2',s,1)+hc(r_2',s,1)x_A(\bmod\ q)$$

the message recovery signature apparatus being characterized in that the function ha satisfies $ha(r_2',s,1)=r_2'+s+1$, the function hb satisfies $hb(r_2',s,1)=r_2'$, and the function hc satisfies $hc(r_2',s,1)=s$.

10. A message recovery signature apparatus for signing a message m with a secret key $x_A$ using a discrete logarithm problem as a basis for security, based on operations performed on a finite field GF(p) where p is a prime number and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{21}(k)=g^k$;

message masking means for generating a masked message $r_2$ from the commitment $r_1$ and the message m according to a function $f_{22}(r_1,m)$ that maps GF(p)×GF(p) into the finite field GF(p), wherein the function $f_{22}(r_1,m)$ has an inverse function $f^{-1}{}_{22}(r_1,f_{22}(r_1,m))=m$;

signature message generating means for generating a signature message $r_2'$ from the masked message $r_2$ according to a function $f_{23}(r_2)=r_2'(\bmod\ q)$; and signature generating means for calculating, when Zq={0, 1, . . . , q−1} is a finite ring and ha, hb, and hc are functions that map Zq×Zq×Zq into Zq, a signature s which satisfies $$ha(r_2',s,1)k=hb(r_2',s,1)+hc(r_2',s,1)x_A(\bmod\ q)$$

the message recovery signature apparatus being characterized in that the function ha satisfies $ha(r_2',s,1)=r_2'+s+1$
the function hb satisfies $hb(r_2',s,1)=s$, and
the function hc satisfies $hc(r_2',s,1)=r_2'$.

11. A message recovery signature apparatus for signing a message m with a secret key $x_A$ using a discrete logarithm problem as a basis for security, based on operations performed on a finite field $GF(p^r)$ where p is a prime number, r is a positive integer, and g is an element whose order is q the message recovery signature apparatus comprising:

secret key storing means for storing the secret key $x_A$;

random number generating means for generating a random number k;

commitment generating means for generating a commitment r from the random number k according to a function $f_{24}(k)=g^k$;

message masking means for generating a masked message $r_2$ from the commitment $r_1$ and the message m according to a function $f_{25}(r_1,m)$ that maps $GF(p^r) \times GF(p^R)$ into the finite field $GF(p^r)$, wherein the function $f_{25}(r_1,m)$ has an inverse function $f^{-1}{}_{25}(r_1,f_{25}(r_1,m))=m$;

converted message generating means for generating a converted message $rc_2$ from the masked message $r_2$ according to a function $f_{26}(r_2)$ that maps the finite field $GF(p^r)$ into a finite ring $Zp^r=\{0, 1, \ldots, p^{r-1}\}$, wherein the function $f_{26}(r_2)=\pi(r_2)$, and wherein when $\{\alpha_1, \alpha_2, \ldots \alpha_r\}$ are base points on $GF(p)$ of the finite field $GF(p^r)$ and $\{x_1, x_2, \ldots, x_r\}$ are elements of $GF(p)$, $$\pi(x)=x_1+x_2p+\ldots+x_rp^{r-1}$$

for an element $x=x_1\alpha_1+\ldots+x_r\alpha_r$ of the finite field $GF(p^r)$;

signature message generating means for generating a signature message $rc_2'$ from the converted message $rc_2$ according to a function $f_{27}(rc_2)=c_2'(\text{mod } q)$; and signature generating means for calculating, when $Zq=\{0, 1, \ldots, q-1\}$ is a finite ring and ha, hb, and hc are functions that map $Zq \times Zq \times Zq$ into $Zq$, a signature s which satisfies $$ha(rc_2',s,1)k=hb(rc_2',s,1)+hc(rc_2',s,1)x_A(\text{mod } q)$$

the message recovery signature apparatus being characterized in that
the function ha satisfies $ha(rc_2',s,1)=rc_2'$,
the finction hb satisfies $hb(rc_2',s,1)=rc_2'+s+1$, and
the function hc satisfies $hc(rc_2',s,1)=s$.

12. A message recovery signature apparatus for signing a message in with a secret key $x_A$ using a discrete logarithm problem as a basis:for security, based on operations performed on a finite field $GF(p^r)$ where p is a prime number, r is a positive integer, and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{24}(k)=g^k$;

message masking means for generating a masked message $r_2$ from the commitment $r_1$ and the message in according to a function $f_{25}(r_1,m)$ that maps $GF(p^r) \times GF(p^r)$ into the finite field $GF(p^r)$, wherein the function $f_{25}(r_1,m)$ has an inverse function $f^{-1}{}_{25}(r_1,f_{25}(r_1,m))=m$;

converted message generating means for generating a converted message $rc_2$ from the masked message $r_2$ according to a function $f_{26}(r_2)$ that maps the finite field $GF(p^r)$ into a finite ring $Zp^r=\{0, 1, \ldots, p^{r-1}\}$, wherein the function $f_{26}(r_2)=\pi(r_2)$, and wherein when $\{\alpha_1, \alpha_2, \ldots \alpha_r\}$ are base points on $GF(p)$ of the finite field $GF(p^r)$ and $\{x_1, x_2, \ldots, x_r\}$ are elements of $GF(p)$, $$\pi(x)=x_1+x_2p+\ldots+x_rp^{r-1}$$

for an element $x=x_1\alpha_1+\ldots+x_r\alpha_r$ of the finite field $GF(p^r)$;

signature message generating means for generating a signature message $rc_2'$ from the converted message $rc_2$ according to a function $f_{27}(rc_2)=c_2'(\text{mod } q)$; and signature generating means for calculating, when $Zq=\{0, 1, \ldots, q-1\}$ is a finite ring and ha, hb, and hc are functions that map $Zq \times Zq \times Zq$ into $Zq$, a signature s which satisfies $$ha(rc_2',s,1)k=hb(rc_2',s,1)+hc(rc_2',s,1)x_A(\text{mod } q)$$

the message recovery signature apparatus being characterized in that
the function ha satisfies $ha(rc_2',s,1)=s$,
the function hb satisfies $hb(rc_2',s,1)=rc_2'+s+1$, and
the function hc satisfies $hc(rc_2',s,1)=rc_2'$.

13. A message recovery signature apparatus for signing a message m with a secret key $x_A$; using a discrete logarithm problem as a basis for security, based on operations performed on a finite field $GF(p^r)$ where p is a prime number, r is a positive integer, and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{24}(k)=g^k$;

message masking means for generating a masked message $r_2$ from the commitment $r_1$ and the message m according to a function $f_{25}(r_1,m)$ that maps $GF(p^r) \times GF(p^r)$ into the finite field $GF(p^r)$, wherein the function $f_{25}(r_1,m)$ has an inverse function $f^{-1}{}_{25}(r_1,f_{25}(r_1,m))=m$;

converted message generating means for generating a converted message $rc_2$ from the masked message $r_2$ according to a function $f_{26}(r_2)$ that maps the finite field $GF(p^r)$ into a finite ring $Zp^r=\{0, 1, \ldots, p^{r-1}\}$, wherein the function $f_{26}(r_2)=\pi(r_2)$, and wherein when $\{\alpha_1, \alpha_2, \ldots \alpha_r\}$ are base points on $GF(p)$ of the finite field $GF(p^r)$ and $\{x_1, x_2, \ldots, x_r\}$ are elements of $GF(p)$, $$\pi(x)=x_1+x_2p+\ldots+x_rp^{r-1}$$

for an element $x=x_1\alpha_1+\ldots+x_r\alpha_r$ of the finite field $GF(p^r)$;

signature message generating means for generating a signature message $rc_2'$ from the converted message $rc_2$ according to a function $f_{27}(rc_2)=rc_2'(\text{mod } q)$; and signature generating means for calculating, when $Zq=\{0, 1, \ldots, q-1\}$ is a finite ring and ha, hb, and hc are functions that map $Zq \times Zq \times Zq$ into Zq, a signature s which satisfies $$ha(rc_2',s,1)k=hb(rc_2',s,1)+hc(rc_2',s,1)x_A \pmod q$$

the message recovery signature apparatus being characterized in that the function ha satisfies $ha(rc_2',s,1)=s$, the function hb satisfies $hb(rc_2',s,1)=rc_2'$, and the function hc satisfies $hc(rc_2',s,1)=rc_2'+s+1$.

14. A message recovery signature apparatus for signing a message m with a secret key $x_A$ using a discrete logarithm problem as a basis for security, based on operations performed on a finite field GF(p) where p is a prime number, r is a positive integer, and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{24}(k)=g^k$;

message masking means for generating a masked message $r_2$ from the commitment $r_1$ and the message m according to a function $f_{25}(r_1,m)$ that maps $GF(p^r) \times GF(p^r)$ into the finite field $GF(p^r)$, wherein the function $f_{25}(r_1,m)$ has an inverse function $f^{-1}{}_{25}(r_1,f_{25}(r_1,m))=m$;

converted message generating means for generating a converted message $rc_2$ from the masked message $r_2$ according to a function $f_{26}(r_2)$ that maps the finite field $GF(p^r)$ into a finite ring $Zp^r=\{0, 1, \ldots, p^{r-1}\}$, wherein the function $f_{26}(r_2)=\pi(r_2)$, and wherein when $\{\alpha_1, \alpha_2, \ldots \alpha_r\}$ are base points on GF(p) of the finite field $GF(p^r)$ and $\{x_1, x_2, \ldots, x_r\}$ are elements of GF(p), $$\pi(x)=x_1+x_2p+\ldots+x_rp^{r-1}$$

for an element $x=x_1\alpha_1+\ldots+x_r\alpha_r$, of the finite field $GF(p^r)$;

signature message generating means for generating a signature message $rc_2'$ from the converted message $rc_2$ according to a function $f_{27}(rc_2)=rc_2' \pmod q$; and signature generating means for calculating, when $Zq=\{0, 1, \ldots, q-1\}$ is a finite ring and ha, hb, and hc are functions that map $Zq \times Zq \times Zq$ into Zq, a signature s which satisfies $$ha(rc_2',s,1)k=hb(rc_2',s,1)+hc(rc_2',s,1)x_A \pmod q$$

the message recovery signature apparatus being characterized in that the function ha satisfies $ha(rc_2',s,1)=rc_2'$, the function hb satisfies $hb(rc_2',s,1)=s$, and the function hc satisfies $hc(rc_2',s,1)=rc_2'+s+1$.

15. A message recovery signature apparatus for signing a message m with a secret key $x_A$ using a discrete logarithm problem as a basis for security, based on operations performed on a finite field $GF(p^r)$ where p is a prime number, r is a positive integer, and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{24}(k)=g^k$;

message masking means for generating a masked message $r_2$ from the commitment $r_1$ and the message m according to a function $f_{25}(r_1,m)$ that maps $GF(p^r) \times GF(p^r)$ into the finite field $GF(p^r)$, wherein the function $f_{25}(r_1,m)$ has an inverse function $f^{-1}{}_{25}(r_1,f_{25}(r_1,m))=m$;

converted message generating means for generating a converted message $rc_2$ from the masked message $r_2$ according to a function $f_{26}(r_2)$ that maps the finite field $GF(p^r)$ into a finite ring $Zp^r=\{0, 1, \ldots, p^{r-1}\}$, wherein the function $f_{26}(r_2)=\pi(r_2)$, and wherein when $\{\alpha_1, \alpha_2, \ldots \alpha_r\}$ are base points on GF(p) of the finite field $GF(p^r)$ and $\{x_1, x_2, \ldots, x_r\}$ are elements of GF(p), $$\pi(x)=x_1+x_2p+\ldots+x_rp^{r-1}$$

for an element $x=x_1\alpha_1+\ldots+x_r\alpha_r$, of the finite field $GF(p^r)$;

signature message generating means for generating a signature message $rc_2'$ from the converted message $rc_2$ according to a function $f_{27}(rc_2)=rc_2' \pmod q$; and signature generating means for calculating, when $Zq=\{0, 1, \ldots, q-1\}$ is a finite ring and ha, hb, and hc are functions that map $Zq \times Zq \times Zq$ into Zq, a signature s which satisfies $$ha(rc_2',s,1)k=hb(rc_2',s,1)+hc(rc_2',s,1)x_A \pmod q$$

the message recovery signature apparatus being characterized in that the function ha satisfies $ha(rc_2',s,1)=rc_2'+s+1$, the finction hb satisfies $hb(rc_2',s,1)=rc_2'$, and the function hc satisfies $hc(rc_2',s,1)=s$.

16. A message recovery signature apparatus for signing a message m with a secret key $x_A$ using a discrete logarithm problem as a basis for security, based on operations performed on a finite field $GF(p^r)$ where p is a prime number, r is a positive integer, and g is an element whose order is q, the message recovery signature apparatus comprising:

secret key storing means for storing the secret key $x_A$;

random number generating means for generating a random number k;

commitment generating means for generating a commitment $r_1$ from the random number k according to a function $f_{24}(k)=g^k$;

message masking means for generating a masked message $r_2$ from the commitment $r_1$ and the message m according to a function $f_{25}(r_1,m)$ that maps $GF(p^r) \times GF(p^r)$ into the finite field $GF(p^r)$, wherein the function $f_{25}(r_1,m)$ has an inverse function $f^{-1}{}_{25}(r_1,f_{25}(r_1,m))=m$;

converted message generating means for generating a converted message $rc_2$ from the masked message $r_2$ according to a function $f_{26}(r_2)$ that maps the finite field $GF(p^r)$ into a finite ring $Zp^r=\{0, 1, \ldots, p^{r-1}\}$, wherein the function $f_{26}(r_2)=\pi(r_2)$, and wherein when $\{\alpha_1, \alpha_2, \ldots \alpha_r\}$ are base points on GF(p) of the finite field GF(p') and $\{x_1, x_2, \ldots, x_r\}$ are elements of GF(p), $$\pi(x)=x_1+x_2p+ \ldots +x_rp^{r-1}$$

for an element $x=x_1\alpha_1+ \ldots +x_r\alpha_r$ of the finite field GF(p');

signature message generating means for generating a signature message $rc_2'$ from the converted message $rc_2$ according to a function $f_{27}(rc_2)=rc_2'$(mod q); and signature generating means for calculating, when Zq={0, 1, ..., q–1} is a finite ring and ha, hb, and hc are functions that map Zq×Zq×Zq into Zq, a signature s which satisfies $$ha(rc_2',s,1)k=hb(rc_2',s,1)+hc(rc_2',s,1)x_A(\text{mod } q)$$

the message recovery signature apparatus being characterized in that the function ha satisfies $ha(rc_2',s,1)rc_2+s+1$, the function hb satisfies $hb(rc_2',s,1)=s$, and the function hc satisfies $hc(rc_2',s,1)=rc_2'$.

17. A message recovery signature apparatus for signing a message m with a secret key $x_A$ using a discrete logarithm problem as a basis for security, based on operations performed on an elliptic curve E(GF(p)) defined over a finite field GF(p) where p is a prime number and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{21}(k)=kG$;

message masking means for generating a masked message $r_2$ from the commitment $R_1$ and the message m according to a function $F_{22}(R_1,m)$ that maps E(GF(p))×GF(p) into the finite field GF(p), wherein $F_{22}(R_1,m)=r_2$ and $F^{-1}{}_{22}(R_1,r_2)=m$;

signature message generating means for generating a signature message $r_2'$ from the masked message $r_2$ according to a function $F_{23}(r_2)=r_2'$(mod q); and signature generating means for calculating, when Zq={0, 1, ..., q–1) is a finite ring and ha, hb, and hc are functions that map Zq×Zq×Zq into Zq, a signature s which satisfies $$ha(r_2',s,1)k=hb(r_2',s,1)+hc(r_2',s,1)x_A(\text{mod } q)$$

the message recovery signature apparatus being characterized in that the function ha satisfies $ha(r_2',s,1)=r_2'$, the function hb satisfies $hb(r_2',s,1)=r_2'+s+1$, and the function hc satisfies $hc(r_2',s,1)=s$.

18. A message recovery signature apparatus for signing a message m with a secret key $x_A$, using a discrete logarithm problem as a basis for security, based on operations performed on an elliptic curve E(GF(p)) defined over a finite field GF(p) where p is a prime number and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{21}(k)=kG$;

message masking means for generating a masked message $r_2$ from the commitment $R_2'$ and the message m according to a function $F_{22}(R_1,m)$ that maps E(GF(p))×GF(p) into the finite field GF(p), wherein the $F_{22}(R_1,m)=r_2$ and $F^{-1}{}_{22}(R_1,r_2)=m$;

signature message generating means for generating a signature message $r_2'$ from the masked message $r_2$ according to a function $F_{23}(r_2)=_2'$(mod q); and signature generating means for calculating, Zq={0, 1, ..., q–1} is a finite ring and ha, hb, and hc are functions that map Zq×Zq×Zq into Zq, a signature s which satisfies $$ha(r_2',s,1)k=hb(r_2',s,1)+hc(r_2',s,1)x_A(\text{mod } q)$$

the message recovery signature apparatus being characterized in that the function ha satisfies $ha(r_2',s,1)=s$, the function hb satisfies $hb(r_2',s,1)=r_2'+s+1$, and the function hc satisfies $hc(r_2',s,1)=r_2'$.

19. A message recovery signature apparatus for signing a message m with a secret key $x_A$ using a discrete logarithm problem as a basis for security, based on operations performed on an elliptic curve E(GF(p)) defined over a finite field GF(p) where p is a prime number and G is an element whose order is q, the message recovery signature apparatus comprising: secret key storing means for storing the secret key $x_A$; random number generating means for generating a random number k; commitment generating means for generating a commitment $R_1$ from the random number k according to a function $F_{21}(k)=kG$;

message masking means for generating a masked message $r_2$ from the commitment $R_1$ and the message m according to a function $F_{22}(R_1,m)$ that maps E(GF(p))×GF(p) into the finite field GF(p), wherein $F_{22}(R_1,m)=r_2$ and $F^{-1}{}_{22}(R_1,r_2)=m$;

signature message generating means for generating a signature message $r_2'$ from the masked message $r_2$ according to a function $F_{23}(r_2)=_2'$(mod q); and signature generating means for calculating, when Zq={0, 1, ..., q–1} is a finite ring and ha, hb, and hc are functions that map Zq×Zq×Zq into Zq, a signature s which satisfies $$ha(r_2',s,1)k=hb(r_2',s,1)+hc(r_2',s,1)x_A(\text{mod } q)$$

the message recovery signature apparatus being characterized in that the function ha satisfies $ha(r_2',s,1)=s$, the function hb satisfies $hb(r_2',s,1)$ $r_2'$, and the function hc satisfies $hc(r_2',s,1)=r_2'+s+1$.

20. A message recovery signature apparatus for signing a message m with a secret key $x_A$ using a discrete logarithm problem as a basis for security, based on operations performed on an elliptic curve E(GF(p)) defined over a finite field GF(p) where p is a prime number and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{21}(k)=kG$;

message masking means for generating a masked message $r_2$ from the commitment $R_1$ and the message m according to a function $F_{22}(r_1,m)$ that maps $E(GF(p))\times GF(p)$ into the finite field $GF(p)$, wherein $F_{22}(R_1,m)=r_2$ and $F^{-1}_{22}(R_1,r_2)=m$;

signature message generating means for generating a signature message $r_2'$ from the masked message $r_2$ according to a function $F_{23}(r_2)=_2'(\text{mod } q)$; and signature generating means for calculating, $Zq=\{0, 1, \ldots, q-1\}$ is a finite ring and ha, hb, and hc are functions that map $Zq\times Zq\times Zq$ into $Zq$, a signature s which satisfies $$ha(r_2',s,1)k=hb(r_2',s,1)+hc(r_2',s,1)x_A(\text{mod } q)$$

the message recovery signature apparatus being characterized in that the function ha satisfies $ha(r_2',s,1)=r_2'$, the function hb satisfies $hb(r_2',s,1)=s$, and the function hc satisfies $hc(r_2',s,1)=r_2'+s+1$.

21. A message recovery signature apparatus for signing a message m with a secret key $x_A$ using a discrete logarithm problem as a basis for security, based on operations performed on an elliptic curve $E(GF(p))$ defined over a finite field $GF(p)$ where p is a prime number and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{21}(k)=kG$;

message masking means for generating a masked message $r_2$ from the commitment $R_1$ and the message m according to a function $F_{22}(R_1,m)$ that maps $E(GF(p))\times GF(p)$ into the finite field $GF(p)$, wherein $F_{22}(R_1,m)=r_2$ and $F^{-1}_{22}(R_1,r_2)=m$;

signature message generating means for generating a signature message $r_2'$ from the masked message $r_2$ according to a function $F_{23}(r_2)=_2'(\text{mod } q)$; and signature generating means for calculating, $Zq=\{0, 1, \ldots, q-1\}$ is a finite ring and ha, hb, and hc are functions that map $Zq\times Zq\times Zq$ into $Zq$, a signature s which satisfies $$ha(r_2',s,1)k=hb(r_2',s,1)+hc(r_2',s,1)x_A(\text{mod } q)$$

the message recovery signature apparatus being characterized in that the function ha satisfies $ha(r_2',s,1)=r_2'+s+1$, the function hb satisfies $hb(r_2',s,1)=r_2'$, and the function hc satisfies $hc(r_2',s,1)=s$.

22. A message recovery signature apparatus for signing a message m with a secret key $x_A$ using a discrete logarithm problem as a basis for security, based on operations performed on an elliptic curve $E(GF(p))$ defined over a finite field $GF(p)$ where p is a prime number and G is an element whose order is q, the message recovery signature apparatus comprising:

secret key storing means for storing the secret key $x_A$;

random number generating means for generating a random number $k_2$ commitment generating means for generating a commitment $R_1$ from the random number k according to a function $F_{21}(k)=kG$;

message masking means for generating a masked message $r_2$ from the commitment $R_1$ and the message m according to a function $F_{22}(R_1,m)$ that maps $E(GF(p))\times GF(p)$ into the finite field $GF(p)$, wherein $F_{22}(R_1,m)=r_2$ and $F^{-1}_{22}(R_1,r_2)=m$;

signature message generating means for generating a signature message $r_2'$ from the masked message $r_2$ according to a function $F_{23}(r_2)=_2'(\text{mod } q)$; and signature generating means for calculating, $Zq=\{0, 1, \ldots, q-1\}$ is a finite ring and ha, hb, and hc are functions that map $Zq\times Zq\times Zq$ into $Zq$, a signature s which satisfies $$ha(r_2',s,1)k=hb(r_2',s,1)+hc(r_2',s,1)x_A(\text{mod } q)$$

the message recovery signature apparatus being characterized in that the function ha satisfies $ha(r_2',s,1)=r_2'+s+1$, the function hb satisfies $hb(r_2', s,1)=s$, and the function hc satisfies $hc(r_2',s,1)=r_2'$.

23. A message recovery signature apparatus for signing a message m with a secret key $x_A$ using a discrete logarithm problem as a basis for security, based on operations performed on an elliptic curve $E(GF(p^r))$ defined over a finite field $GF(p^r)$ where p is a prime number, r is a positive integer, and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{24}(k)=kG$;

message masking means for generating a masked message $r_2$ from the commitment $R_1$ and the message m according to a function $F_{25}(R_1,m)$ that maps $E(GF(p)\times GF(p^r)$ into the finite field $GF(p^r)$, wherein $F_{22}(R_1,m)=r_2$ and $F^{-1}_{22}(R_1,r_2)=m$;

converted message generating means for generating a converted message $rc_2$, from the masked message $r_2$, according to a function $F_{26}(r_2)$ that maps the finite field $GF(p)$ into a finite ring $Zq^r=\{0, 1, \ldots, p^{r-1}\}$;

signature message generating means for generating a signature message $rc_2'$ from the converted message $rc_2$, according to a function $F_{27}(rc_2)=rc_2'(\text{mod } q)$; and signature generating means for calculating, when $Zq=\{0, 1, \ldots, q-1\}$ is a finite ring and ha, hb, and hc are functions that map $Zq\times Zq\times Zq$ into $Zq$, a signature s which satisfies $$ha(rc_2',s,1)k=hb(rc_2',s,1)+hc(rc_2',s,1)x_A(\text{mod } q)$$

the message recovery signature apparatus being characterized in that the function ha satisfies $ha(rc_2',s,1)=rc_2'$, the function hb satisfies $hb(rc_2',s,1)=rc_2'+s+1$, and the function hc satisfies $hc(rc_2',s,1)=s$.

24. A message recovery signature apparatus for signing a message m with a secret key $x_A$ using a discrete logarithm problem as a basis for security, based on operations performed on an elliptic curve $E(GF(p^r))$ defined over a finite field $GF(p^r)$ where p is a prime number, r is a positive integer, and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{24}(k)=kG$;

message masking means for generating a masked message $r_2$ from the commitment $R_1$ and the message m according to a function $F_{25}(R_1,m)$ that maps $E(GF(p^r)) \times GF(p^r)$ into the finite field $GF(p^r)$, wherein $F_{22}(R_1,m)=r_2$ and $F^{-1}{}_{22}(R_1,r_2)=m$;

converted message generating means for generating a converted message $rc_2$ from the masked message $r_2$ according to a function $F_{26}(r_2)$ that maps the finite field $GF(p^r)$ into a finite ring $Zq^r=\{0, 1, \ldots, p^{r-1}\}$;

signature message generating means for generating a signature message $rc_2'$ from the converted message $rc_2$, according to a function $F_{27}(rc_2)=rc_2' \pmod q$; and signature generating means for calculating, when $Zq=\{0, 1, \ldots, q-1\}$ is a finite ring and ha, hb, and hc are functions that map $Zq \times Zq \times Zq$ into Zq, a signature s which satisfies $$ha(rc_2',s,1)k=hb(rc_2',s,1)+hc(rc_2',s,1)x_A \pmod q$$

the message recovery signature apparatus being characterized in that the function ha satisfies $ha(rc_2',s,1)=s$, the finction hb satisfies $hb(rc_2',s,1)=c_2'+s+1$, and the function hc satisfies $hc(rc_2',s,1)=rc_2$.

25. A message recovery signature apparatus for signing a message m with a secret key $x_A$ using a discrete logarithm problem as a basis for security, based on operations performed on an elliptic curve $E(GF(p^r))$ defined over a finite field $GF(p^r)$ where p is a prime number, r is a positive integer, and G is an element whose order is q, the message recovery signature apparatus comprising:

secret key storing means for storing the secret key $x_A$;

random number generating means for generating a random number k commitment generating means for generating a commitment $R_1$ from the random number k according to a function $F_{24}(k)=kG$;

message masking means for generating a masked message $r_2$ from the commitment $R_1$ and the message m according to a function $F_{25}(R_1,m)$ that maps $E(GF(p^r)) \times GF(p^r)$ into the finite field $GF(p^r)$, wherein $F_{25}(R_1,m)=r_2$ and $F^{-1}{}_{25}(R_1,r_2)=m$;

converted message generating means for generating a converted message $rc_2$ from the masked message $r_2$ according to a function $F_{26}(r_2)$ that maps the finite field $GF(p^r)$ into a finite ring $Zq^r=\{0, 1, \ldots, p^{r-1}\}$;

signature message generating means for generating a signature message $rc_2'$ from the converted message $rc_2$, according to a function $F_{27}(rc_2)=rc_2' \pmod q$; and signature generating means for calculating, when $Zq=\{0, 1, \ldots, q-1\}$ is a finite ring and ha, hb, and hc are functions that map $Zq \times Zq \times Zq$ into Zq, a signature s which satisfies $$ha(rc_2',s,1)k=hb(rc_2',s,1)+hc(rc_2',s,1)x_A \pmod q$$

the message recovery signature apparatus being characterized in that the function ha satisfies $ha(rc_2',s,1)=s$, the function hb satisfies $hb(rc_2',s,1)=rc_2'$, and the function hc satisfies $hc(rc_2',s,1)=rc_2'+s+1$.

26. A message recovery signature apparatus for signing a message m with a secret key $x_A$ using a discrete logarithm problem as a basis for security, based on operations performed on an elliptic curve $E(GF(p^r))$ defined over a finite field $GF(p^r)$ where p is a prime number, r is a positive integer, and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{24}(k)=kG$;

message masking means for generating a masked message $r_2$ from the commitment $R_1$ and the message m according to a function $F_{25}(R_1,m)$ that maps $E(GF(p^r)) \times GF(p^r)$ into the finite field $GF(p^r)$, wherein $F_{25}(R_1,m)=r_2$ and $F^{-1}{}_{25}(R_1,r_2)=m$;

converted message generating means for generating a converted message $rc_2$ from the masked message $r_2$ according to a function $F_{26}(r_2)$ that maps the finite field $GF(p^r)$ into a finite ring $Zq^r=\{0, 1, \ldots, p^{r-1}\}$;

signature message generating means for generating a signature message $rc_2'$ from the converted message $rc_2$, according to a function $F_{27}(rc_2)=rc_2' \pmod q$; and signature generating means for calculating, when $Zq=\{0, 1, \ldots, q-1\}$ is a finite ring and ha, hb, and hc are functions that map $Zq \times Zq \times Zq$ into Zq, a signature s which satisfies $$ha(rc_2',s,1)k=hb(rc_2',s,1)+hc(rc_2',s,1)x_A \pmod q$$

the message recovery signature apparatus being characterized in that the function ha satisfies $ha(rc_2',s,1)=rc_2'$, the function hb satisfies $hb(rc_2',s,1)=s$, and the function hc satisfies $hc(rc_2',s,1)=rc_2'+s+1$.

27. A message recovery signature apparatus for signing a message m with a secret key $x_A$ using a discrete logarithm problem as a basis for security, based on operations performed on an elliptic curve $E(GF(p^r))$ defined over a finite field $GF(p^r)$ where p is a prime number, r is a positive integer, and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{24}(k)=kG$;

message masking means for generating a masked message $r_2$ from the commitment $R_1$ and the message m according to a function $F_{25}(R_1,m)$ that maps $E(GF(p^r)) \times GF(p^r)$ into the finite field $GF(p^r)$, wherein $F_{25}(R_1,m)=r_2$ and $F^{-1}{}_{25}(R_1,r_2)=m$;

converted message generating means for generating a converted message $rc_2$ from the masked message $r_2$ according to a function $F_{26}(r_2)$ that maps the finite field $GF(p^r)$ into a finite ring $Zq^r=\{0, 1, \ldots, p^{r-1}\}$;

signature message generating means for generating a signature message $rc_2'$ from the converted message $rc_2$, according to a function $F_{27}(rc_2)=rc_2'(\bmod q)$; and signature generating means for calculating, when $Zq=\{0, 1, \ldots, q-1\}$ is a finite ring and ha, hb, and hc are functions that map $Zq \times Zq \times Zq$ into $Zq$, a signature s which satisfies $$ha(rc_2',s,1)k=hb(rc_2',s,1)+hc(rc_2',s,1)x_A (\bmod q)$$

the function ha satisfies $ha(rc_2',s,1)=rc_2'+s+1$,
the function hb satisfies $hb(rc_2',s,1)=rc_2'$, and
the function hc satisfies $hc(rc_2',s,1)=s$.

28. A message recovery signature apparatus for signing a message m with a secret key $x_A$ using a discrete logarithm problem as a basis for security, based on operations performed on an elliptic curve $E(GF(p^r))$ defined over a finite field $GF(p^r)$ where p is a prime number, r is a positive integer, and G is an element whose order is q, the message recovery signature apparatus comprising:

secret key storing means for storing the secret key $x_A$;

random number generating means for generating a random number k;

commitment generating means for generating a commitment $R_1$ from the random number k according to a function $F_{24}(k)=kG$;

message masking means for generating a masked message $r_2$ from the commitment $R_1$ and the message m according to a function $F_{25}(R_1,m)$ that maps $E(GF(Pr)) \times GF(p^r)$ into the finite field $GF(p^r)$, wherein $F_{25}(R_1,m)=r_2$ and $F^{-1}_{25}(R_1,r_2)=m$;

converted message generating means for generating a converted message $rc_2$ from the masked message $r_2$ according to a function $F_{26}(r_2)$ that maps the finite field $GF(p^r)$ into a finite ring $Zq^r=\{0, 1, \ldots, p^{r-1}\}$;

signature message generating means for generating a signature message $rc_2'$ from the converted message $rc_2$, according to a function $F_{27}(rc_2)=rc_2'(\bmod q)$; and signature generating means for calculating, when $Zq=\{0, 1, \ldots, q-1\}$ is a finite ring and ha, hb, and hc are functions that map $Zq \times Zq \times Zq$ into $Zq$, a signature s which satisfies $$ha(rc_2',s,1)k=hb(rc_2',s,1)+hc(rc_2',s,1)x_A (\bmod q)$$

the message recovery signature apparatus being characterized in that the function ha satisfies $ha(rc_2',s,1)=rc_2'+s+1$,
the function hb satisfies $hb(rc_2',s,1)=s$, and
the function hc satisfies $hc(rc_2',s,1)=rc_2'$.

* * * * *

UNITED STATES PATENT AND TRADEMARK OFFICE
CERTIFICATE OF CORRECTION

PATENT NO. : 6,697,946 B1
DATED : February 24, 2004
INVENTOR(S) : Atsuki Miyaji

It is certified that error appears in the above-identified patent and that said Letters Patent is hereby corrected as shown below:

Column 20,
Line 49, please delete "finction" and insert -- function --

Signed and Sealed this

Sixth Day of July, 2004

JON W. DUDAS
*Acting Director of the United States Patent and Trademark Office*